US012403537B2

(12) United States Patent
Sawa et al.

(10) Patent No.: US 12,403,537 B2
(45) Date of Patent: *Sep. 2, 2025

(54) HOLE SAW

(71) Applicant: MILWAUKEE ELECTRIC TOOL CORPORATION, Brookfield, WI (US)

(72) Inventors: Max R. Sawa, Palatine, IL (US); Geoffrey R. Piller, Grafton, WI (US); Kenneth D. Peterson, Little Suamico, WI (US); Travis J. DuMez, Port Washington, WI (US); James Ernest Pangerc, Pewaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/606,157

(22) Filed: Mar. 15, 2024

(65) Prior Publication Data

US 2024/0217008 A1 Jul. 4, 2024

Related U.S. Application Data

(60) Continuation of application No. 18/065,305, filed on Dec. 13, 2022, which is a division of application No.
(Continued)

(51) Int. Cl.
*B23B 51/04* (2006.01)
(52) U.S. Cl.
CPC ...... *B23B 51/0467* (2022.01); *B23B 51/0466* (2013.01); *B23B 51/0426* (2013.01); *B23B 2260/072* (2013.01); *Y10T 408/895* (2015.01)
(58) Field of Classification Search
CPC ............ B23B 51/0426; B23B 51/0466; B23B 51/0467; Y10T 408/895
See application file for complete search history.

(56) References Cited

U.S. PATENT DOCUMENTS

| 1,505,897 A | 8/1924 | Kikta |
| 2,879,036 A | 3/1959 | Wheeler |

(Continued)

FOREIGN PATENT DOCUMENTS

| CN | 2865975 Y | 2/2007 |
| CN | 201394679 Y | 2/2010 |

(Continued)

OTHER PUBLICATIONS

European Patent Office Search Report for Application No. 17192777.5 dated Mar. 13, 2018, 7 pages.
(Continued)

*Primary Examiner* — Eric A. Gates
(74) *Attorney, Agent, or Firm* — Michael Best & Friedrich LLP

(57) ABSTRACT

A hole saw is movable about a rotational axis in a cutting direction to cut into a workpiece. The hole saw includes a cylindrical body with a sidewall having a first end and a second end opposite the first end, a gullet formed in the sidewall between a leading surface, a trailing surface, and a bottom surface of the sidewall, and a support aperture formed in the sidewall. The gullet extends through the first end of the body. The support aperture is entirely surrounded by the sidewall. A majority of the support aperture circumferentially overlaps with the gullet. At least a portion of the support aperture is positioned closer than the bottom surface of the sidewall to the second end. The hole saw includes a cutting tooth coupled to the first end of the sidewall adjacent the gullet and an end cap coupled to the second end of the sidewall.

20 Claims, 12 Drawing Sheets

Related U.S. Application Data

16/910,166, filed on Jun. 24, 2020, now Pat. No. 11,559,840, which is a division of application No. 15/863,253, filed on Jan. 5, 2018, now Pat. No. 10,730,119.

(60) Provisional application No. 62/443,317, filed on Jan. 6, 2017.

(56) References Cited

U.S. PATENT DOCUMENTS

| | | |
|---|---|---|
| 3,049,033 A | 8/1962 | Benjamin et al. |
| 3,080,934 A | 3/1963 | Berscheid |
| 3,387,637 A | 6/1968 | Ferguson et al. |
| 3,905,718 A | 9/1975 | Luckenbill et al. |
| 4,527,638 A | 7/1985 | Sanchez et al. |
| D282,369 S | 1/1986 | de Villiers |
| 4,728,231 A | 3/1988 | Kunimori et al. |
| 4,744,704 A | 5/1988 | Galvefors |
| 4,802,799 A | 2/1989 | Rachev |
| D303,118 S | 8/1989 | Cox |
| 4,984,944 A | 1/1991 | Pennington, Jr. et al. |
| 5,092,716 A | 3/1992 | Omi |
| 5,338,135 A | 8/1994 | Noguchi et al. |
| 5,451,128 A | 9/1995 | Hattersley |
| 5,452,971 A | 9/1995 | Nevills |
| 5,492,187 A | 2/1996 | Neukirchen et al. |
| 5,597,274 A | 1/1997 | Behner |
| 5,599,145 A | 2/1997 | Reinauer et al. |
| 5,651,646 A | 7/1997 | Banke et al. |
| D391,974 S | 3/1998 | Brutscher |
| D392,297 S | 3/1998 | Brutscher |
| 5,733,074 A | 3/1998 | Stock et al. |
| 5,743,162 A | 4/1998 | Sundström |
| 5,758,561 A | 6/1998 | Curtsinger et al. |
| 5,794,503 A | 8/1998 | Asada |
| 5,803,677 A | 9/1998 | Brutscher et al. |
| 5,813,802 A | 9/1998 | Ajimi et al. |
| 5,896,800 A | 4/1999 | Curtsinger et al. |
| 5,904,455 A | 5/1999 | Krenzer et al. |
| 5,931,614 A | 8/1999 | Meyen et al. |
| 5,988,953 A | 11/1999 | Berglund et al. |
| 6,007,279 A | 12/1999 | Malone, Jr. |
| 6,021,857 A | 2/2000 | Birk et al. |
| 6,065,370 A | 5/2000 | Curtsinger et al. |
| D438,219 S | 2/2001 | Brutscher |
| 6,205,902 B1 | 3/2001 | Vuorinen |
| 6,299,389 B1 | 10/2001 | Barazani |
| 6,551,036 B2 | 4/2003 | Heule |
| 6,588,992 B2 | 7/2003 | Rudolph |
| 6,599,063 B1 | 7/2003 | Capstran |
| D478,105 S | 8/2003 | Morton et al. |
| D478,106 S | 8/2003 | Morton et al. |
| D478,339 S | 8/2003 | Morton et al. |
| D478,919 S | 8/2003 | Morton et al. |
| 6,601,495 B2 | 8/2003 | Cranna |
| 6,623,220 B2 | 9/2003 | Nuss et al. |
| 6,702,047 B2 | 3/2004 | Huber |
| 6,705,807 B1 | 3/2004 | Rudolph et al. |
| 6,786,684 B1 | 9/2004 | Ecker |
| 6,820,519 B2 | 11/2004 | Lefebvre |
| 6,959,775 B2 | 11/2005 | Pedersen |
| 6,981,911 B2 | 1/2006 | Martina |
| D516,594 S | 3/2006 | Morton |
| 7,018,145 B2 | 3/2006 | Mast et al. |
| 7,174,823 B2 | 2/2007 | Cranna |
| 7,189,036 B1 | 3/2007 | Watson |
| 7,241,089 B2 | 7/2007 | Mast et al. |
| 7,258,180 B2 | 8/2007 | Kersten |
| RE40,297 E | 5/2008 | Berglund et al. |
| 7,401,667 B2 | 7/2008 | Duscha et al. |
| D588,175 S | 3/2009 | Morton |
| 7,658,136 B2 | 2/2010 | Rompel et al. |
| D629,820 S | 12/2010 | Van Ryswyk |
| 7,892,235 B2 | 2/2011 | Ellis |
| D634,343 S | 3/2011 | Burke, III |
| 7,997,836 B2 | 8/2011 | Kim et al. |
| 8,092,126 B2 | 1/2012 | Tanaka |
| 8,123,443 B2 | 2/2012 | Khangar et al. |
| 8,157,028 B2 | 4/2012 | Kersten |
| 8,162,945 B2 | 4/2012 | Ellis |
| 8,172,845 B2 | 5/2012 | Ellis |
| D664,574 S | 7/2012 | Burke, III |
| 8,286,736 B2 | 10/2012 | Weaver et al. |
| 8,444,353 B2 | 5/2013 | Khangar et al. |
| D683,772 S | 6/2013 | Wang |
| 8,475,459 B2 | 7/2013 | Ellis |
| D687,472 S | 8/2013 | Novak et al. |
| D692,470 S | 10/2013 | Novak et al. |
| 8,550,756 B2 | 10/2013 | Borschert et al. |
| 8,573,907 B2 | 11/2013 | Kalomeris et al. |
| 8,579,554 B2 | 11/2013 | Novak et al. |
| 8,579,555 B2 | 11/2013 | Novak et al. |
| 8,608,413 B2 | 12/2013 | Miyanaga |
| D701,544 S | 3/2014 | Novak et al. |
| 8,721,236 B2 | 5/2014 | Kazda et al. |
| D706,845 S | 6/2014 | Richter |
| D708,650 S | 7/2014 | Richter |
| D711,441 S | 8/2014 | Novak et al. |
| 9,120,162 B2 | 9/2015 | Keightley |
| 9,233,424 B2 | 1/2016 | Grolimund et al. |
| 9,248,518 B2 | 2/2016 | Elliston et al. |
| D765,159 S | 8/2016 | Novak et al. |
| D789,428 S | 6/2017 | Novak et al. |
| 9,884,373 B2 | 2/2018 | Keightley |
| 10,058,931 B2 | 8/2018 | Sussman et al. |
| D845,362 S | 4/2019 | Novak et al. |
| D871,877 S | 1/2020 | Terris et al. |
| 10,532,412 B2 | 1/2020 | Ward |
| D875,798 S | 2/2020 | Su |
| 10,730,119 B2 | 8/2020 | Sawa et al. |
| D973,733 S | 12/2022 | DuMez et al. |
| 11,559,840 B2 * | 1/2023 | Sawa ............... B23B 51/0466 |
| 12,233,467 B2 * | 2/2025 | Sawa ............... B23B 51/0466 |
| 2002/0050196 A1 | 5/2002 | Fluhrer et al. |
| 2002/0081165 A1 | 6/2002 | Hecht |
| 2002/0137433 A1 | 9/2002 | Lee et al. |
| 2003/0141115 A1 | 7/2003 | Britten et al. |
| 2004/0050234 A1 | 3/2004 | Fluhrer et al. |
| 2004/0065183 A1 | 4/2004 | Asada |
| 2005/0188792 A1 | 9/2005 | Asada |
| 2006/0112799 A1 | 6/2006 | Hambleton et al. |
| 2007/0160435 A1 | 7/2007 | Chao |
| 2007/0212179 A1 | 9/2007 | Khangar et al. |
| 2008/0264231 A1 | 10/2008 | Coe et al. |
| 2008/0267725 A1 | 10/2008 | Mills |
| 2008/0298922 A1 | 12/2008 | Oettle |
| 2009/0000454 A1 | 1/2009 | Baernthaler et al. |
| 2009/0044674 A1 | 2/2009 | Neitzell |
| 2009/0126712 A1 | 5/2009 | Kullmann et al. |
| 2009/0274923 A1 | 11/2009 | Hall et al. |
| 2009/0279972 A1 | 11/2009 | Novak et al. |
| 2010/0054885 A1 | 3/2010 | Goetz et al. |
| 2010/0126326 A1 | 5/2010 | Cloutier |
| 2011/0197736 A1 | 8/2011 | Lizzi et al. |
| 2011/0217133 A1 | 9/2011 | Ibarra et al. |
| 2012/0230788 A1 | 9/2012 | Bozic et al. |
| 2013/0149059 A1 * | 6/2013 | Cranna ............... B23D 61/121 83/835 |
| 2013/0296866 A1 | 11/2013 | Ellis |
| 2014/0013916 A1 | 1/2014 | Athad |
| 2014/0017023 A1 | 1/2014 | Grollmund et al. |
| 2014/0023446 A1 | 1/2014 | Piller et al. |
| 2014/0023447 A1 | 1/2014 | Thom et al. |
| 2014/0255117 A1 | 9/2014 | Tseng |
| 2014/0271007 A1 | 9/2014 | Richter |
| 2015/0000497 A1 | 1/2015 | Engvall et al. |
| 2015/0239052 A1 | 8/2015 | Trumble et al. |
| 2016/0059329 A1 | 3/2016 | Fendeleur et al. |
| 2016/0166260 A1 | 6/2016 | Ellis |
| 2016/0175945 A1 | 6/2016 | Chang |
| 2016/0175947 A1 | 6/2016 | Chang |
| 2017/0120347 A1 | 5/2017 | Lourenco et al. |
| 2017/0120357 A1 | 5/2017 | Trautner et al. |

(56) References Cited

U.S. PATENT DOCUMENTS

| | | |
|---|---|---|
| 2018/0085833 A1 | 3/2018 | Ward |
| 2018/0193926 A1 | 7/2018 | Sawa et al. |
| 2019/0217400 A1 | 7/2019 | Ding et al. |
| 2024/0375193 A1* | 11/2024 | Sawa ............ B23B 51/0466 |

FOREIGN PATENT DOCUMENTS

| | | |
|---|---|---|
| CN | 201597079 U | 10/2010 |
| CN | 102689051 A | 9/2012 |
| CN | 202963637 U | 6/2013 |
| CN | 204171467 U | 2/2015 |
| CN | 204321316 U | 5/2015 |
| CN | 204565301 U | 8/2015 |
| CN | 204818283 U | 12/2015 |
| CN | 204997156 U | 1/2016 |
| CN | 205519922 U | 8/2016 |
| DE | 2422452 A1 | 11/1975 |
| DE | 9417252 U1 | 1/1995 |
| DE | 19623081 C1 | 1/1998 |
| DE | 19810713 A1 | 9/1999 |
| DE | 19910219 A1 | 9/1999 |
| DE | 19913727 A1 | 10/1999 |
| DE | 19939323 A1 | 3/2000 |
| DE | 10042402 A1 | 5/2001 |
| DE | 20101718 U1 | 5/2001 |
| DE | 20113578 U1 | 10/2001 |
| DE | 10253247 B3 | 1/2004 |
| DE | 202004003900 U1 | 5/2004 |
| DE | 102004003900 A1 | 8/2005 |
| DE | 202005012328 U1 | 10/2005 |
| DE | 202006010180 U1 | 11/2006 |
| DE | 202006011952 U1 | 11/2006 |
| EP | 0118806 A1 | 9/1984 |
| EP | 0216064 A1 | 4/1987 |
| EP | 0352215 A2 | 1/1990 |
| EP | 0612575 A1 | 8/1994 |
| EP | 0715919 A1 | 6/1996 |
| EP | 0729801 A1 | 9/1996 |
| EP | 1024247 A1 | 8/2000 |
| EP | 1078706 A2 | 2/2001 |
| EP | 1080859 A1 | 3/2001 |
| EP | 1431511 A1 | 6/2004 |
| EP | 1852202 A1 | 11/2007 |
| EP | 1944107 A2 | 7/2008 |
| EP | 1944108 A2 | 7/2008 |
| EP | 2502693 A1 | 9/2012 |
| EP | 2987577 A1 | 2/2016 |
| FR | 2302808 A1 | 10/1976 |
| FR | 2421022 A1 | 10/1979 |
| GB | 191517961 A | 12/1915 |
| GB | 550306 A | 1/1943 |
| GB | 2201910 A | 9/1988 |
| JP | H0966411 A | 3/1973 |
| JP | 2004268166 A | 9/2004 |
| SU | 1433650 A1 | 10/1988 |
| WO | WO9706338 A1 | 2/1997 |
| WO | WO2007118718 A1 | 10/2007 |
| WO | WO2012159881 A2 | 11/2012 |
| WO | WO2012159947 A2 | 11/2012 |
| WO | WO2014180925 A1 | 11/2014 |
| WO | WO2016102261 A1 | 6/2016 |
| WO | WO2016102539 A1 | 6/2016 |

OTHER PUBLICATIONS

European Patent Office Search Report for Application No. 18150515.7 dated Jun. 20, 2018, 18 pages.
European Patent Office Search Report for Application No. 18150515.7 dated Sep. 18, 2018, 18 pages.
European Patent Office Extended Search Report for Application No. 20175783.8 dated Aug. 24, 2020 (16 pages).

* cited by examiner

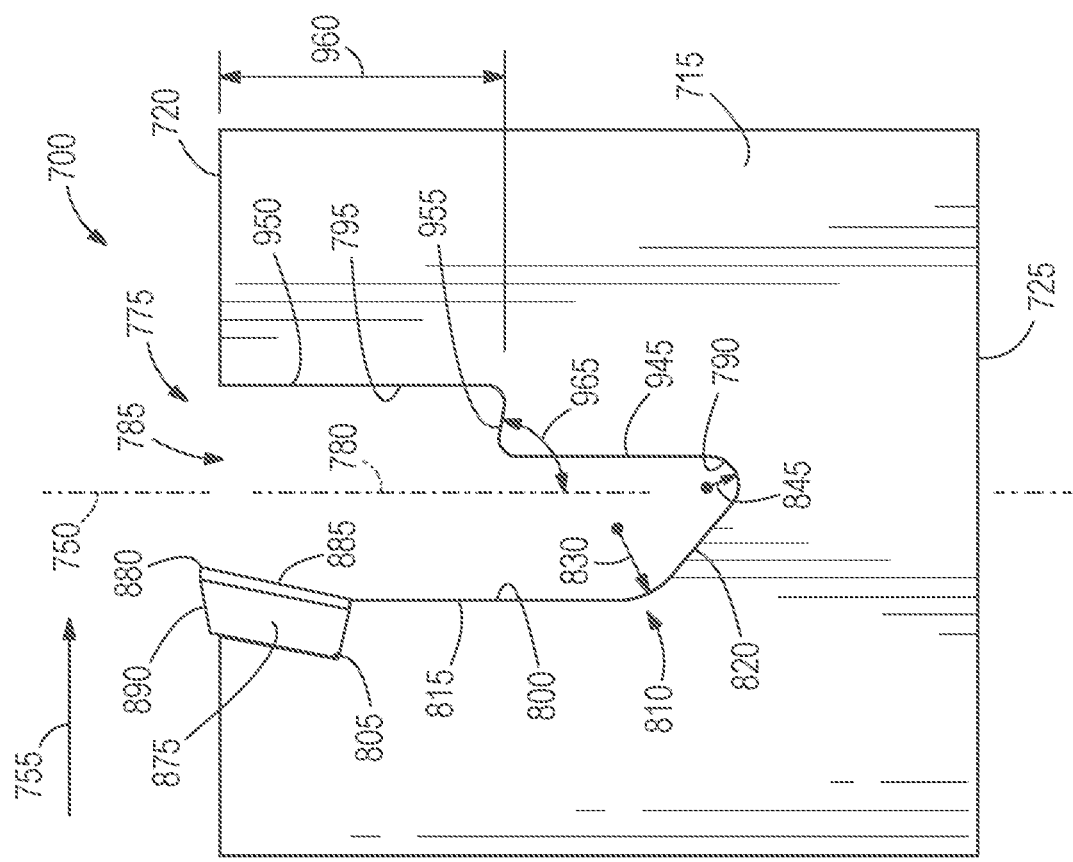
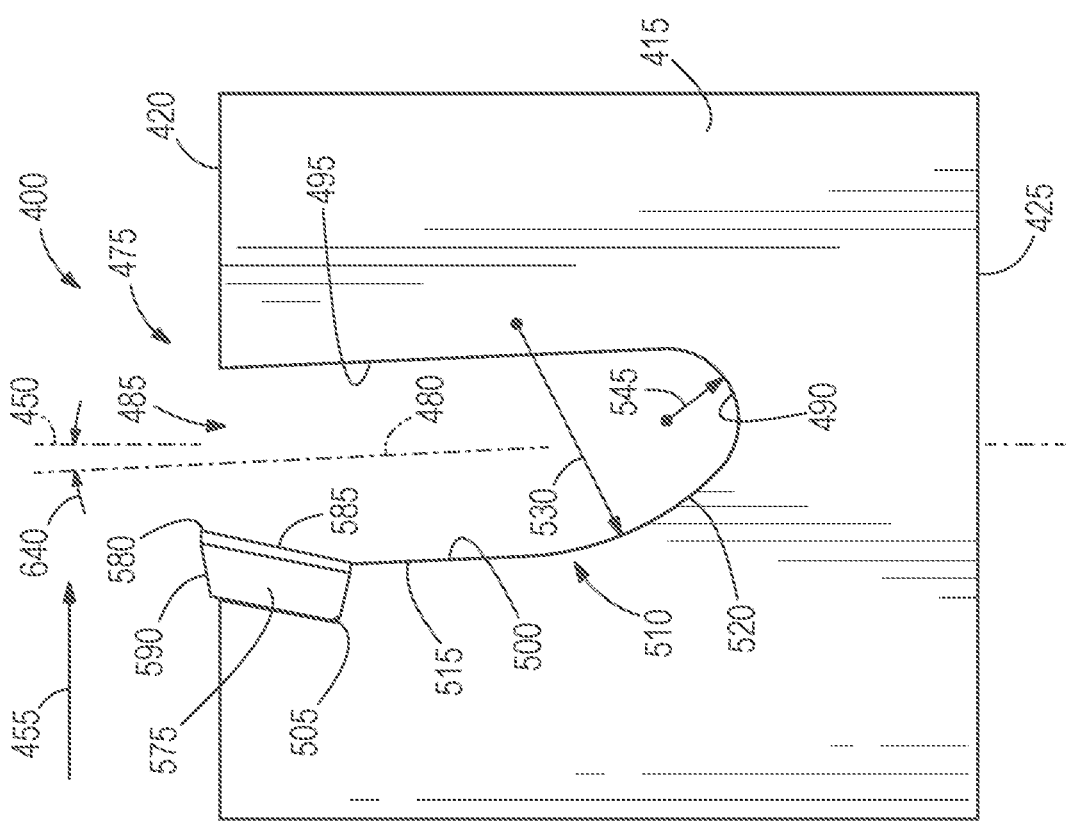
FIG. 7
FIG. 6

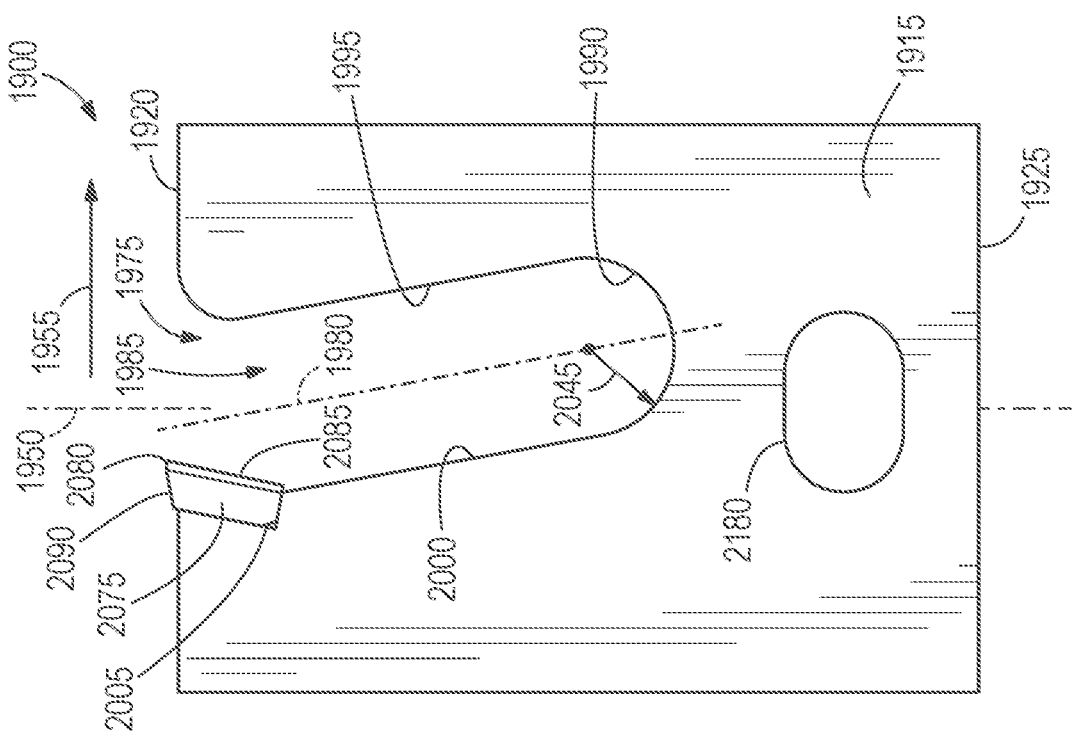
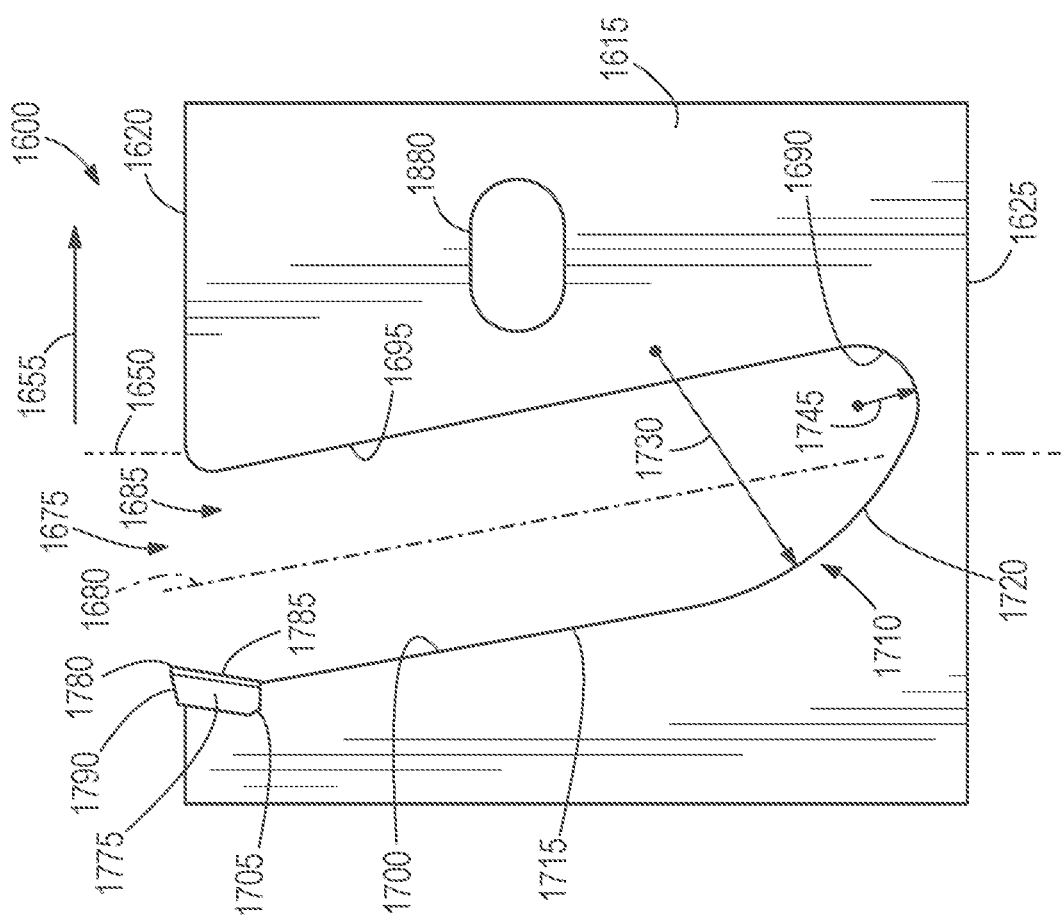
FIG. 12
FIG. 13

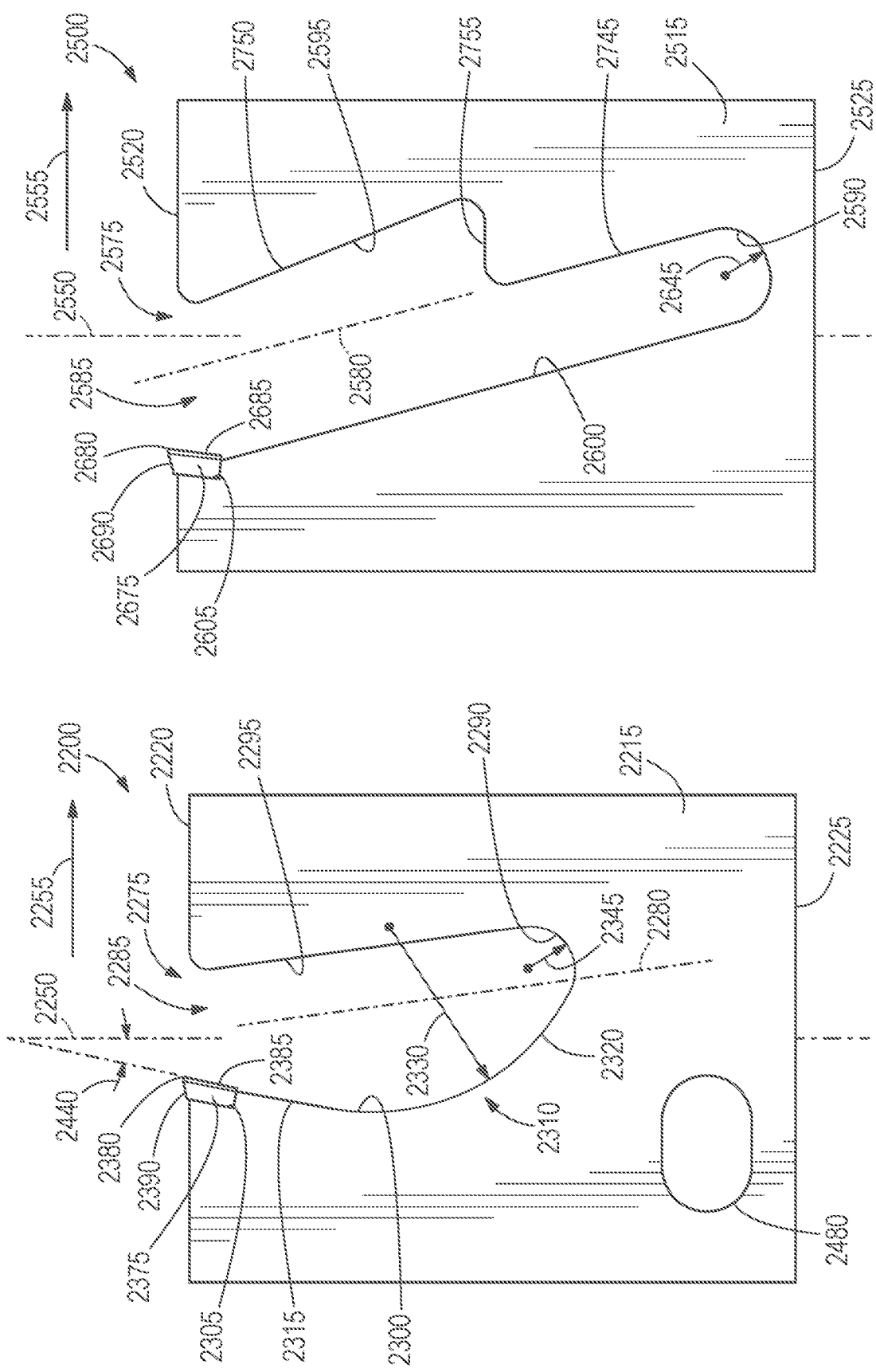

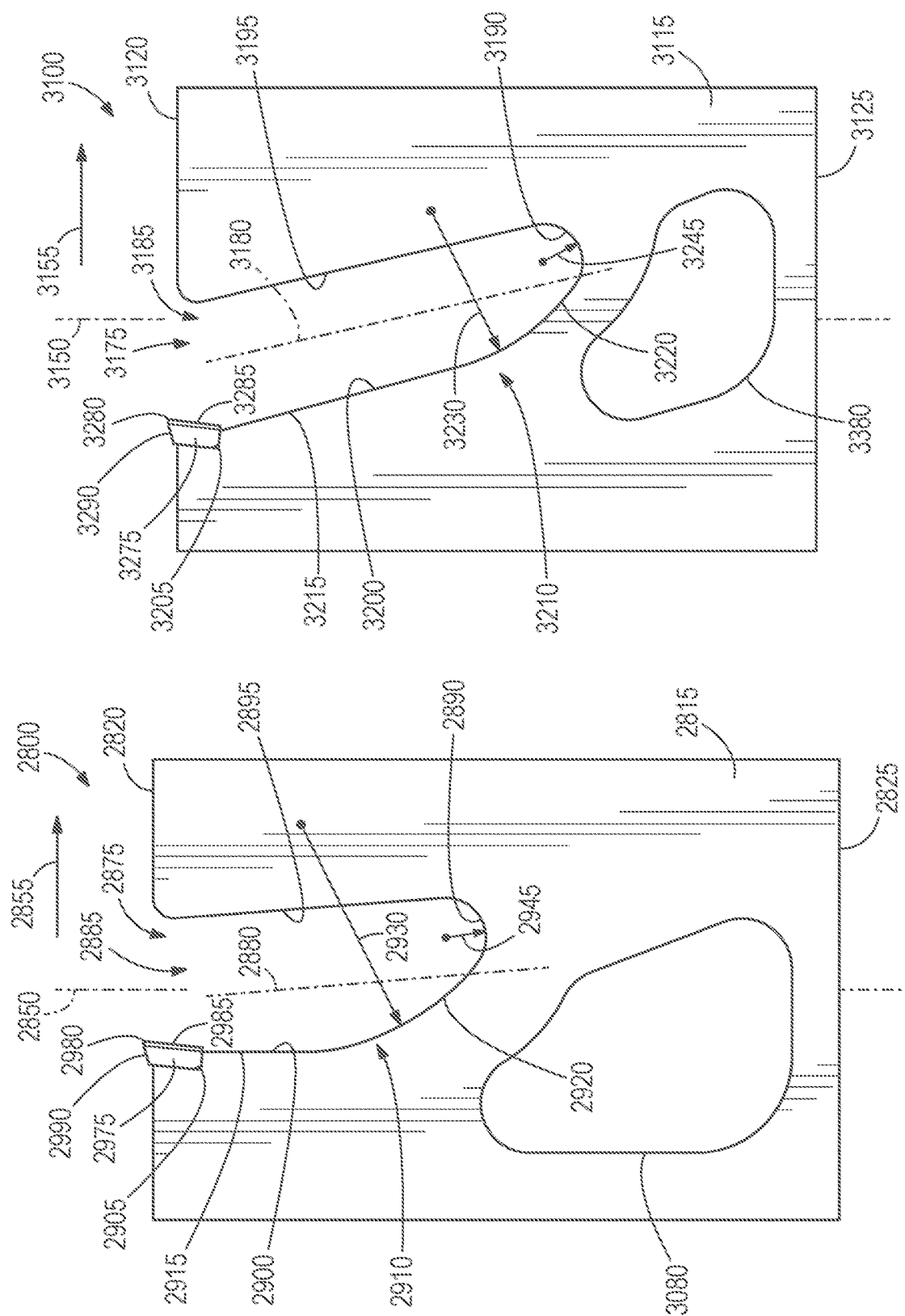

HOLE SAW

CROSS-REFERENCE TO RELATED APPLICATIONS

This application is a continuation of U.S. patent application Ser. No. 18/065,305, filed Dec. 13, 2022, now U.S. Pat. No. 12,233,467, which is a divisional of U.S. patent application Ser. No. 16/910,166, filed Jun. 24, 2020, now U.S. Pat. No. 11,559,840, which is a divisional of U.S. patent application Ser. No. 15/863,253, filed Jan. 5, 2018, now U.S. Pat. No. 10,730,119, which claims priority to U.S. Provisional Patent Application No. 62/443,317, filed Jan. 6, 2017, the entire contents of which are incorporated herein by reference.

FIELD OF THE INVENTION

The present invention relates to hole saws, and more particularly to gullets formed in the hole saws.

SUMMARY

In one aspect, a hole saw is movable about a rotational axis in a cutting direction to cut into a workpiece. The hole saw includes a cylindrical body having a sidewall with a first end and a second end opposite the first end. The cylindrical body also includes a gullet formed in the sidewall between a leading surface, a trailing surface, and a bottom surface of the sidewall. The gullet defines a central longitudinal axis extending between the first and second ends of the sidewall that is obliquely oriented relative to the rotational axis such that the gullet is angled from the first end to the bottom surface in a direction toward the cutting direction. The gullet has a dimension measured parallel to the rotational axis between the first end of the sidewall and the bottom surface of the gullet that is greater than 1.5 inches. The hole saw also includes a cutting tooth coupled to the first end of the sidewall adjacent the gullet.

In another aspect, a hole saw is movable about a rotational axis in a cutting direction to cut into a workpiece. The hole saw includes a cylindrical body having a sidewall with a first end and a second end opposite the first end. The cylindrical body also includes a gullet formed in the sidewall between a leading surface, a trailing surface, and a bottom surface of the sidewall. The gullet extends through the first end of the sidewall and defines a central longitudinal axis extending between the first and second ends of the sidewall. The central longitudinal axis is obliquely oriented relative to the rotational axis such that the gullet is angled from the first end to the bottom surface in a direction toward the cutting direction. The hole saw also includes a cutting tooth coupled to the first end of the sidewall adjacent the gullet. A dimension measured between the leading surface and a tip of the cutting tooth in a direction perpendicular to the rotational axis is between about 0.5 inches and about 0.7 inches.

In yet another aspect, a hole saw is movable about a rotational axis in a cutting direction to cut into a workpiece. The hole saw includes a cylindrical body having a sidewall with a first end and a second end opposite the first end. The cylindrical body also includes a gullet formed in the sidewall between a leading surface, a trailing surface, and a bottom surface of the sidewall. The trailing surface defines a portion having a first radius. The bottom surface has a second radius. The first radius is equal to or larger than the second radius. The gullet extends through the first end of the sidewall and defines a central longitudinal axis extending between the first and second ends of the sidewall. The central longitudinal axis is obliquely oriented relative to the rotational axis such that the gullet is angled from the first end to the bottom surface in a direction toward the cutting direction. The gullet has a first dimension measured parallel to the rotational axis between the first end of the sidewall and the bottom surface of the gullet that is greater than 1.5 inches. The hole saw also includes a cutting tooth coupled to the first end of the sidewall adjacent the gullet. A second dimension measured perpendicular to the rotational axis between the leading surface and a tip of the cutting tooth is between about 0.5 inches and about 0.7 inches.

Other aspects of the invention will become apparent by consideration of the detailed description and accompanying drawings.

BRIEF DESCRIPTION OF THE DRAWINGS

FIG. 6 is a planar side view of a hole saw according to another embodiment of the invention.

FIG. 7 is a planar side view of a hole saw according to another embodiment of the invention.

FIG. 12 is a planar side view of a hole saw according to another embodiment of the invention.

FIG. 13 is a planar side view of a hole saw according to another embodiment of the invention.

FIG. 14 is a planar side view of a hole saw according to another embodiment of the invention.

FIG. 15 is a planar side view of a hole saw according to another embodiment of the invention.

FIG. 16 is a planar side view of a hole saw according to another embodiment of the invention.

FIG. 17 is a planar side view of a hole saw according to another embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings. Terms of degree, such as "about," "substantially," or "approximately" are understood by those of ordinary skill to refer to reasonable ranges outside of the given value, for example, general tolerances associated with manufacturing, assembly, and use of the described embodiments.

Figure 1:
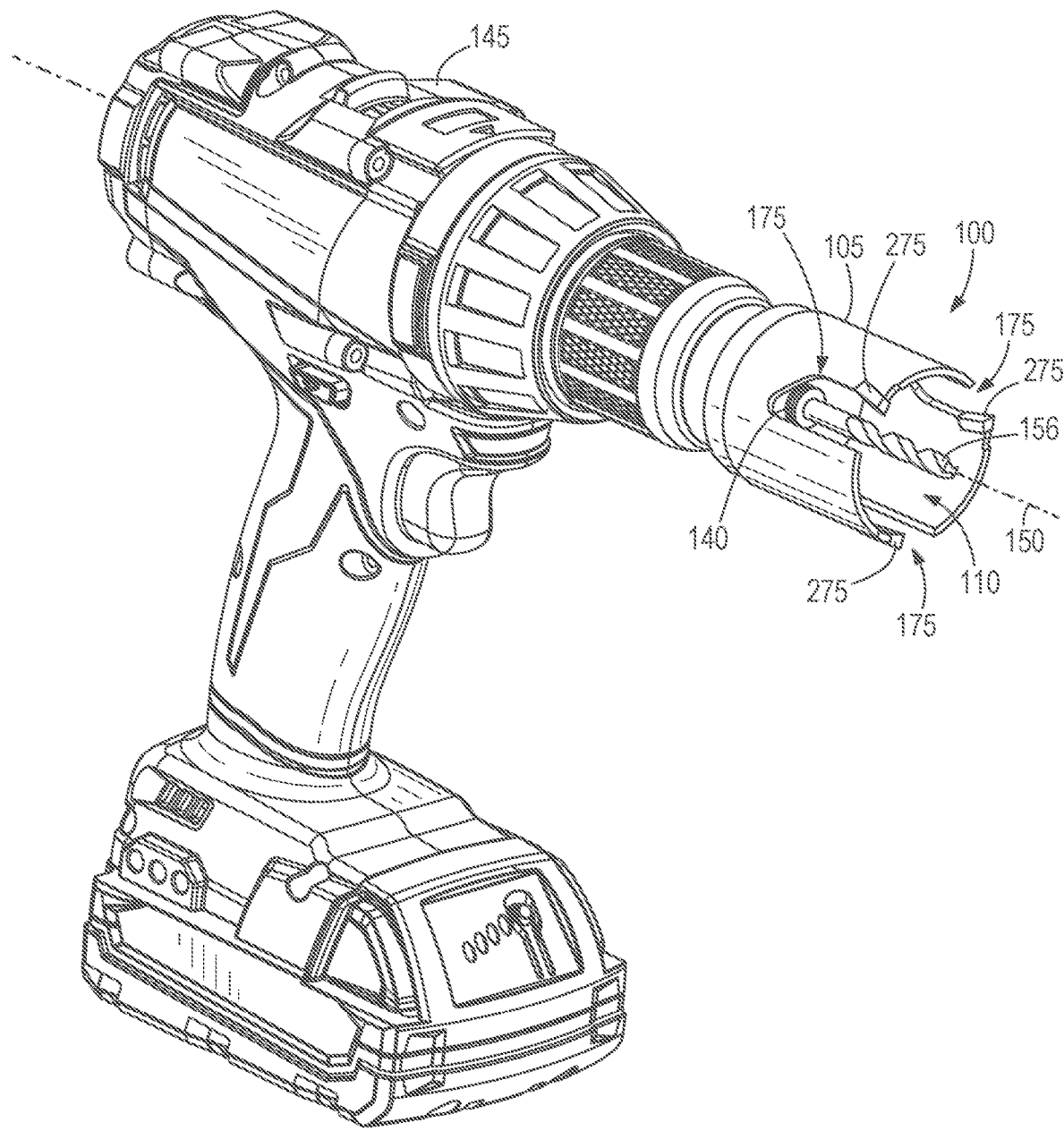
FIG. 1 is a perspective view of a hole saw according to one embodiment of the invention coupled to a power tool.
Figure 2:
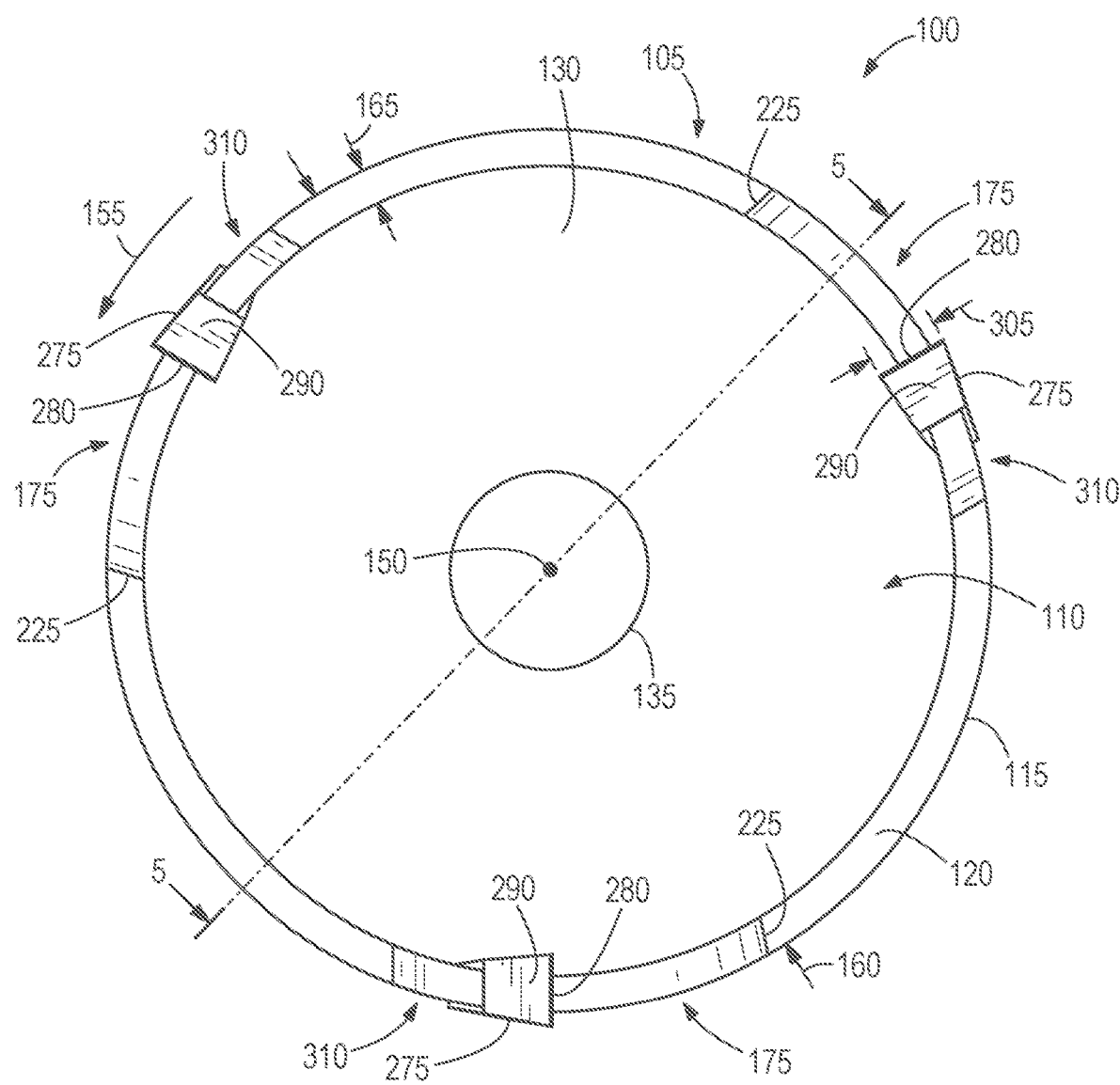
FIG. 2 is an end view of the hole saw of FIG. 1.

FIGS. 1-5 illustrate a hole saw 100 including a cylindrical body 105 defining a cavity 110. The cylindrical body 105 includes a sidewall 115 having a first end 120 and a second end 125 with the second end 125 positioned opposite the first end 120. The hole saw 100 also includes an end cap 130 coupled to the second end 125 and has an aperture 135 sized to receive an arbor 140 such that the hole saw 100 can be coupled to and driven by a tool 145 (e.g., a power drill or the like) via the arbor 140. The tool 145 drives the hole saw 100 about a rotational axis 150 in a cutting direction 155 (FIG. 2). In the illustrated embodiment, the arbor 140 is selectively coupled to the end cap 130, but in other embodiments, the arbor 140 can be fixedly coupled to the end cap 130. In some embodiments, a pilot drill bit 156 (e.g., a twist drill bit, a spade drill bit, etc.) can be selectively or fixedly coupled to the arbor 140 to extend through the cavity 110 and beyond the first end 120 of the sidewall 115. The illustrated cylindrical body 105 is made of a metallic material (e.g., low carbon steel, etc.). In other embodiments, the cylindrical body 105 can be made of a different metallic material (e.g., high carbon steel, etc.).

Figure 3:
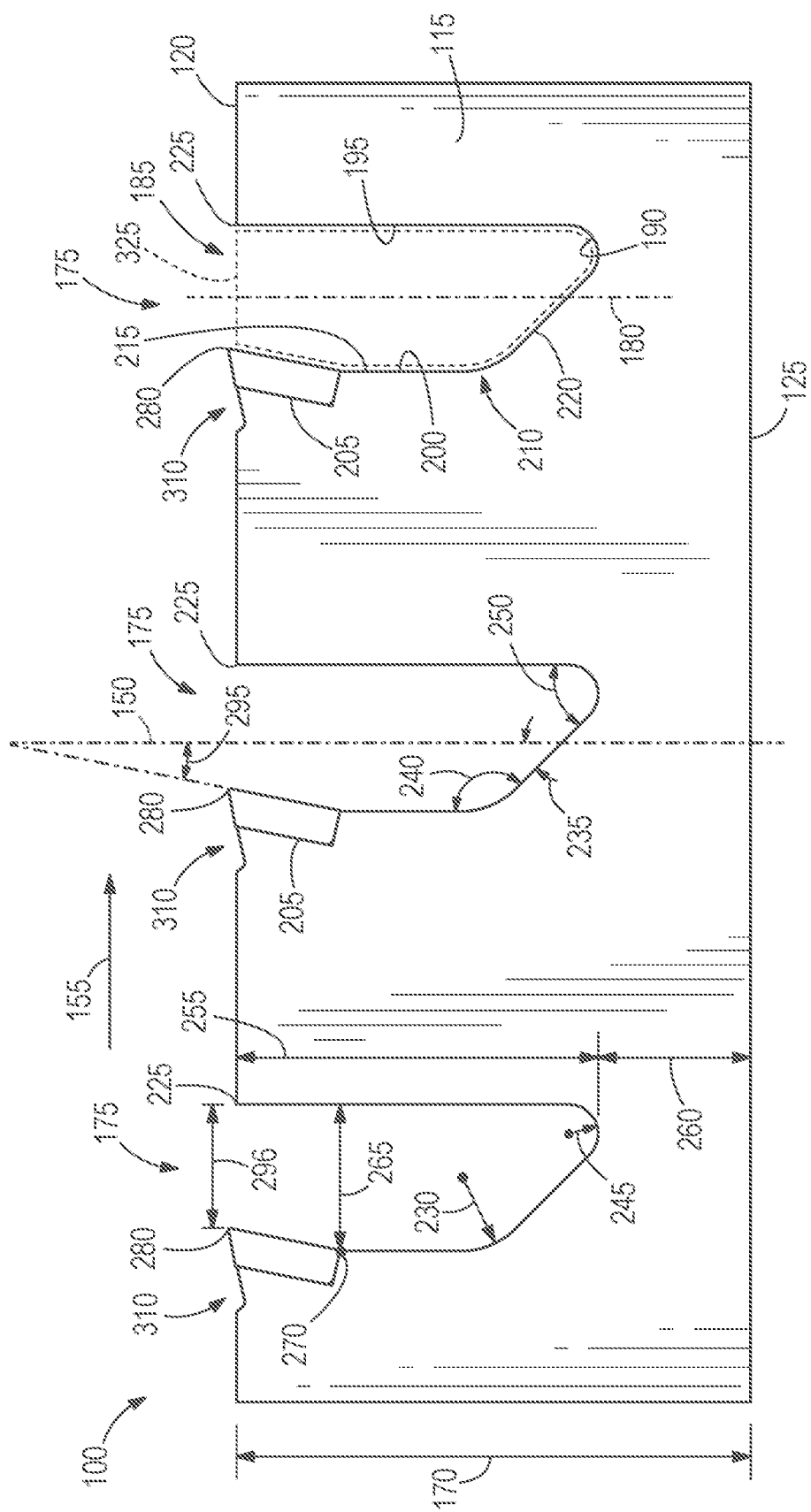
FIG. 3 is a side view of the hole saw of FIG. 1 in a flattened state and illustrating three gullets.

As best shown in FIG. 2, the sidewall 115 defines a maximum outer diameter 160. The outer diameter 160 can be between about 1 inch and about 7 inches. In some embodiments, the outer diameter 160 can be about 1.37 inches, about 2.56 inches, about 4 inches, or about 6.25 inches. In further embodiments, the outer diameter 160 can be greater than 7 inches. The sidewall 115 also defines a maximum thickness 165. The thickness 165 can be between about 0.07 inches and about 0.11 inches. In some embodiments, the thickness 165 can be about 0.08 inches, about 0.09 inches, about 0.1 inches, or about 0.104 inches. As best shown in FIG. 3, the sidewall 115 further defines a sidewall height or dimension 170 extending between the first end 120 and the second end 125 in a direction parallel to the rotational axis 150. The illustrated sidewall height 170 is between about 2.5 inches and about 3 inches. In other embodiments, the sidewall height 170 can be between about 1.5 inches and about 5 inches.

In the illustrated embodiment, the sidewall 115 includes three gullets 175 equally spaced about the rotational axis 150 (e.g., each gullet 175 is spaced about 120 degrees relative to an adjacent gullet 175). In other embodiments, the hole saw 100 can include more than three gullets 175 (e.g., four, five, six, etc.) or can include less than three gullets (e.g., two or one) with the gullets 175 equally or non-equally spaced about the rotational axis 150. For example, the hole saw 100 can include two gullets 175 (spaced 180 degrees apart) when the outer diameter 160 is less than about 2.25 inches.

With reference to FIG. 3, each gullet 175 defines a central longitudinal axis 180 extending between the first end 120 and the second end 125. Each gullet 175 includes an open end 185 adjacent the first end 120 and is defined by a bottom surface 190 of the sidewall 115 opposite the open end 185, a leading surface 195 of the sidewall 115 extending between the open end 185 and the bottom surface 190, and a trailing surface 200 of the sidewall 115 extending between the open end 185 and the bottom surface 190. The leading surface 195 and the trailing surface 200 of each gullet 175 are in relation to the cutting direction 155 of the hole saw 100 (i.e., the leading surface 195 is forward the trailing surface 200 as the hole saw 100 moves in the cutting direction 155). Each trailing surface 200 includes a seat or notch 205 formed adjacent the open end 185 and a trailing surface portion 210 positioned between the notch 205 and the bottom surface 190 in a direction parallel to the rotational axis 150. In particular, a first portion 215 of each trailing surface 200 extends between the notch 205 and the trailing surface portion 210 and a second portion 220 of each trailing surface 200 extends between the trailing surface portion 210 and the bottom surface 190. In addition, an edge 225 is positioned between the leading surface 195 and the first end 120 that defines a substantially 90 degree edge. In other embodiments, the edge 225 can be a curved edge.

In the illustrated embodiment, all three gullets 175 include the substantially same geometry, but in other embodiments, two or more gullets 175 can include different geometries. One of the gullets 175 will be described in detail below but can be applicable to one or more of the remaining gullets 175. The illustrated first portion 215 of the trailing surface 200 is a substantially linear surface oriented substantially parallel to the rotational axis 150. In addition, the central longitudinal axis 180 of the gullet 175 is parallel to the rotational axis 150 so that the first portion 215 is also parallel to the central longitudinal axis 180. In other embodiments, the first portion 215 can be a curved surface. The illustrated trailing surface portion 210 defines a first radius 230 between about 1 inch and about 1.25 inches. In other embodiments, the first radius 230 can be between about 1.25 inches and about 2 inches or the first radius 230 can be between about 0.4 inches and about 1 inch. In addition, the trailing surface portion 210 is formed in a lower half of the gullet 175 in a direction parallel to the rotational axis 150. The illustrated second portion 220 of the trailing surface 200 is a substantially linear surface, but in other embodiments, the second portion 220 can be a curved surface. The second portion 220 is also oriented at an oblique angle 235 relative to the rotational axis 150. The illustrated oblique angle 235 is between about 40 degrees and about 50 degrees. In other embodiments, the oblique angle 235 can be between about 50 degrees and about 70 degrees or the oblique angle 235 can be between about 20 degrees and about 40 degrees. A first angle 240 is defined between the first portion 215 and the second portion 220. The illustrated first angle 240 is between about 130 degrees and about 140 degrees. In other embodiments, the first angle 240 can be between 140 degrees and about 170 degrees, or the first angle 240 can be between about 80 degrees and about 130 degrees. In further embodiments, the first radius 230 of the trailing surface portion 210 can be omitted such that only the first angle 240 is formed between the first portion 215 and the second portion 220. The illustrated bottom surface 190 defines a second radius 245 between about 0.25 inches and about 0.4 inches. In other embodiments, the second radius 245 can be between about 0.4 inches and about 1 inch, or the second radius 245 can be between about 0.1 inches and about 0.25 inches. In some embodiments, the second radius 245 can be equal to or less than the first radius 230. A ratio of the first radius 230 to the second radius 245 is between about 2.5 to about 5. In other embodiments, the ratio of the first radius 230 to the second radius 245 is between about 1 and about 6. In further embodiments, the ratio of the first radius 230 to the second radius 245 is between about 3 and about 4.

The illustrated leading surface 195 is a substantially linear surface oriented substantially parallel to the rotational axis 150. A second angle 250 is defined between the second portion 220 and the leading surface 195. The illustrated second angle 250 is between about 40 degrees and about 50 degrees. In other embodiments, the second angle 250 can be between 50 degrees and about 80 degrees or the second angle 250 can be between about 10 degrees and about 40 degrees. In further embodiments, the second radius 245 can be omitted such that only the second angle 250 is formed between the second portion 220 and the leading surface 195.

With continued reference to FIG. 3, the gullet 175 defines a gullet height or dimension 255 extending between the first end 120 and the bottom surface 190 in a direction parallel to the rotational axis 150. The illustrated gullet height 255 is greater than about 1.5 inches. In other embodiments, the gullet height 255 can be between about 1.7 inches and about 1.9 inches, or the gullet height 255 can be between about 1.9 inches and about 3 inches. As such, a ratio of the sidewall height 170 over the gullet height 255 is about 1.4. In other embodiments, the ratio of the sidewall height 170 over the gullet height 255 can be between about 1.1 and about 2. In further embodiments, the ratio of the sidewall height 170 over the gullet height 255 can be between about 2 and about 4. The illustrated sidewall 115 also defines a height 260 extending between the bottom surface 190 of each gullet 175 and the second end 125 of the sidewall 115. The height 260 is between about 0.7 inches and about 0.9 inches. In other embodiments, the height 260 can be between about 0.9 inches and about 1.5 inches or the height 260 can be between about 0.1 inches and about 0.7 inches. The gullet 175 also defines a maximum gullet width 265 extending between the leading surface 195 and the trailing surface 200 in a direction perpendicular to the rotational axis 150. In particular, the maximum gullet width 265 extends between the leading surface 195 and a point 270 located on the first portion 215 directly below the notch 205. The illustrated maximum gullet width 265 is between about 0.75 inches and about 1.2 inches. In other embodiments, the maximum gullet width 265 can be between about 1.2 inches and about 1.5 inches, or the maximum gullet width 265 can be between about 0.4 inches and about 0.75 inches.

Figure 4:
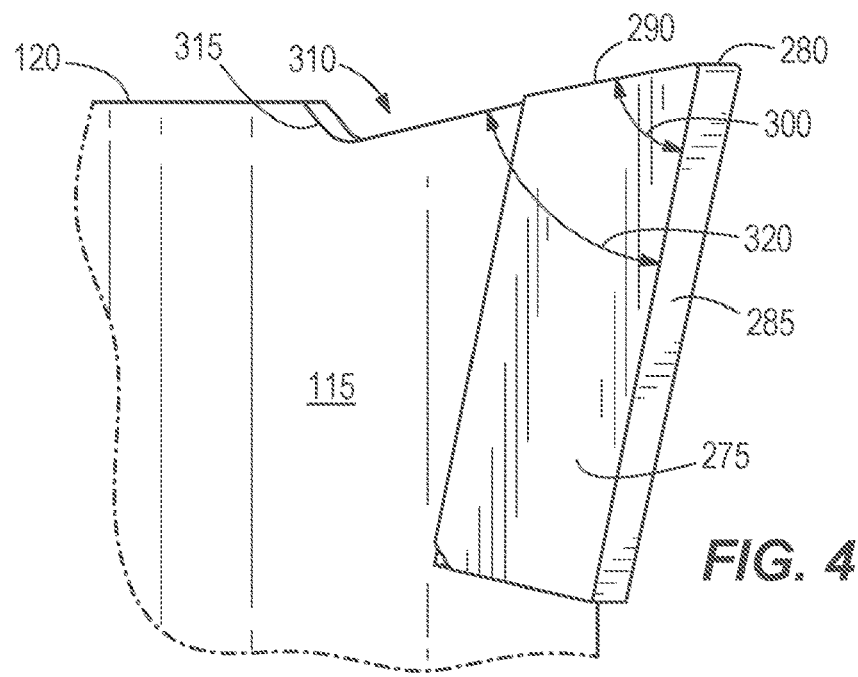
FIG. 4 is a detailed view of a portion of the hole saw of FIG. 3.

The hole saw 100 also includes cutting teeth 275 positioned adjacent the first end 120 of the sidewall 115. Each cutting tooth 275 has a cutting tip 280 positioned beyond the first end 120 (i.e., above the first end 120 as illustrated in FIG. 4). In particular, the cutting teeth 275 are carbide cutting teeth that are seated within the notches 205 of the sidewall 115 and secured to the sidewall 115 (e.g., by a brazing operation or the like). The carbide cutting teeth 275 include a material hardness that is greater than a material hardness of the sidewall 115. In other embodiments, the cutting teeth 275 can be made of a different material (e.g., hardened steel, etc.). In further embodiments, the sidewall 115 can form the cutting teeth 275 so that the cutting teeth 275 are not separately secured to the sidewall 115. Each cutting tooth 275 includes a rake surface 285 and a relief surface 290 with each rake surface 285 facing into one of the gullets 175. Each rake surface 285 defines a positive rake angle 295 (e.g., angled toward the cutting direction 155) relative to the rotational axis 150 between about 5 degrees and about 15 degrees. As such, a minimum gullet width 296 between each cutting tip 280 and the corresponding leading surface 195 perpendicular to the rotational axis 150 is between about 0.5 inches and about 0.7 inches. In other embodiments, the minimum gullet width 296 can be between about 0.7 inches and about 1.2 inches. In further embodiments, the minimum gullet width 296 can be greater than the maximum gullet width 265. In yet further embodiments, the rake angle 295 can be a negative rake angle (e.g., angled away from the cutting direction 155). A tooth angle 300 is defined between the rake surface 285 and the relief surface 290 between about 60 degrees and about 70 degrees (FIG. 4). As best shown in FIG. 2, each cutting tip 280 defines a tip width 305 between about 0.1 inches and about 0.2 inches. The tip width 305 of each cutting tooth 275 is greater than the thickness 165 of the sidewall 115. As such, a total cutting diameter of the hole saw 100 is greater than the maximum outer diameter 160 of the sidewall 115. In other embodiments, the tip width 305 can be substantially the same as the thickness 165 of the sidewall 115 with the cutting teeth 275 bent radially inward or outward relative to the rotational axis 150.

With continued reference to FIG. 4, a recess or relief 310 is formed within the first end 120 of the sidewall 115 directly behind each cutting tooth 275 with a trailing portion 315 of each recess 310 angled in a direction away from the cutting direction 155. Each recess 310 defines a recess angle 320 relative to the rake surface 285 that is less than the tooth angle 300. As such, during a grinding process to shape the cutting teeth 275 (e.g., to shape the tooth angle 300), the recesses 310 provide enough clearance for a grinding wheel or the like to shape the cutting teeth 275 without contacting the sidewall 115.

Once the cutting teeth 275 are coupled to the sidewall 115, each gullet 175 defines an area 325 between the rake surface 285, the trailing surface 200, the bottom surface 190, and the leading surface 195. In the illustrated embodiment, the area 325 of each gullet 175 is equal to or greater than 1.2 inches squared. In other embodiments, the area 325 of each gullet 175 is between about 1.2 inches squared and about 3.5 inches squared. In further embodiments, the area 325 of each gullet 175 is between about 1.2 inches squared and about 2 inches squared. As the hole saw 100 includes three gullets 175, the total area of the illustrated gullets 175 is equal to or greater than 3.6 inches squared. Each gullet 175 also defines a volume, which is determined by multiplying the area 325 of each gullet 175 by the maximum thickness 165 of the sidewall 115. As such, the volume of each gullet 175 is equal to or greater than 0.084 inches cubed. In some embodiments, a ratio of the tip width 305 over the volume of one of the gullets 175 is about 0.2. In other embodiments, the ratio of the tip width 305 over the volume of one of the gullets 175 can be between about 0.1 and about 1.1.

Figure 5:
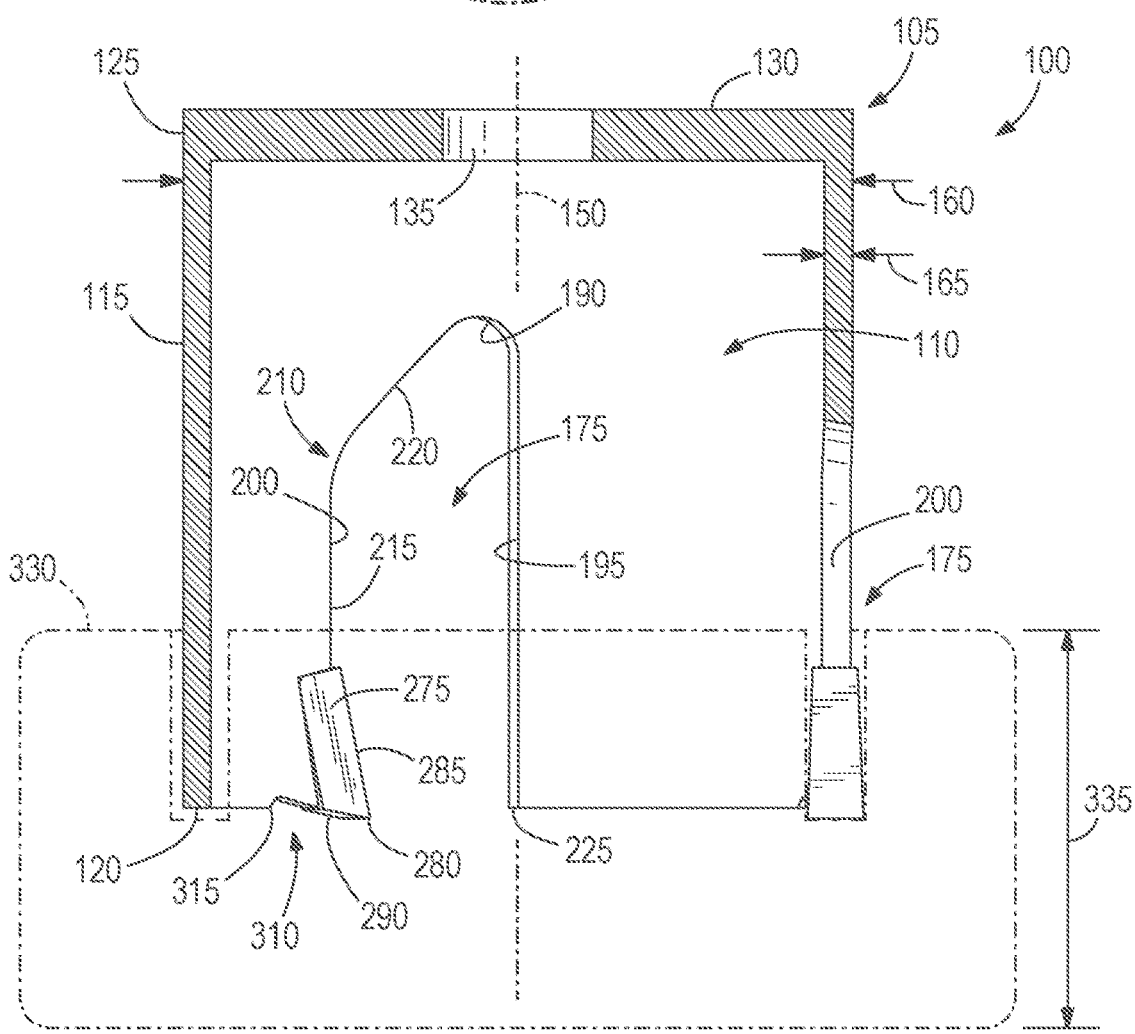
FIG. 5 is a cross sectional view of the hole saw taken along line 5-5 of FIG. 2 illustrating the hole saw cutting through a workpiece.

With reference to FIG. 5, the hole saw 100 is operable to cut into a workpiece 330 that defines a workpiece height 335. In the illustrated embodiment, the workpiece height 335 is about 1.5 inches (e.g., height of a standard 2 by 4 piece of lumber). In other embodiments, the workpiece height 335 can be less than 1.5 inches. In operation, the cutting teeth 275 cut into the workpiece 330, thereby forming workpiece chips that collect within the gullets 175. As the hole saw 100 bores deeper into the workpiece 330, more workpiece chips are collected within the gullets 175. Accordingly, the illustrated gullets 175 include a particular volume to accommodate the workpiece chips as the hole saw 100 cuts into the workpiece 330. If the volume of the gullets 175 is not sufficient to accommodate the workpiece chips, the workpiece chips will build up within the gullets 175 and decrease the efficiency of the hole saw 100 cutting into the workpiece 330. Once the hole saw 100 bores through the workpiece 330, a cylindrical workpiece plug will be removed from the cavity 110 of the hole saw 100. In particular, a user can grip the cylindrical workpiece plug (via their fingers) through the gullets 175 to axially slide the cylindrical workpiece plug along the rotational axis and out of the cavity 110. The minimum gullet width 296 of each gullet 175 is sized to provide enough clearance between each cutting tip 280 and the corresponding leading surface 195 so that a user's finger avoids contact with the cutting tip 280 as the cylindrical workpiece plug is removed from the hole saw 100.

FIG. 6 illustrates a planar view of a portion of a hole saw 400 according to another embodiment. The hole saw 400 is similar to the hole saw 100 of FIGS. 1-5; therefore, similar components are designated with similar references numbers plus 300. At least some differences and/or at least some similarities between the hole saws 100, 400 will be discussed in detail below. In addition, components or features described with respect to one or some of the embodiments described herein are equally applicable to any other embodiments described herein and can include similar reference numbers.

The illustrated hole saw 400 is moveable about a rotational axis 450 in a cutting direction 455 and includes a sidewall 415 having a first end 420 and a second end 425. The sidewall 415 also includes gullets 475 (only one gullet 475 is illustrated in FIG. 6) each defining a central longitudinal axis 480. Each gullet 475 includes a notch 505, an open end 485, a bottom surface 490 defining a second radius 545, a leading surface 495, and a trailing surface 500. Each trailing surface 500 includes a trailing surface portion 510 defining a first radius 530, a first portion 515, and a second portion 520 with the trailing surface portion 510 positioned between the first portion 515 and the second portion 520. In the illustrated embodiment, each first portion 515 is parallel to the leading surface 495; however, in other embodiments, the first portion 515 can be obliquely angled relative to the leading surface 495. In other embodiments, the second portion 520 can be omitted so that the trailing surface portion 510 directly connects with the bottom surface 490. In the illustrated embodiment, the first portion 515 of each trailing surface 500 is oriented at a third angle 640 between about 5 degrees and about 15 degrees relative to the rotational axis 450 so that the first portion 515 is angled from the first end 420 to the second end 425 in a direction toward the cutting direction 455. As a result, each central longitudinal axis 480 is also oriented between about 5 degrees and about 15 degrees relative to the rotational axis 450 so that the central longitudinal axis 480 is angled from the first end 420 to the second end 425 in a direction toward the cutting direction 455. In other embodiments, the third angle 640 is greater than about 5 degrees. In further embodiments, the third angle 640 is less than about 15 degrees. In yet further embodiments, the third angle 640 is between about 1 degree and about 40 degrees.

The hole saw 400 also includes cutting teeth 575 (only one cutting tooth 575 is illustrated in FIG. 6) each having a cutting tip 580 and seated within one notch 505. Each cutting tooth 575 includes a rake surface 585 and a relief surface 590.

FIG. 7 illustrates a planar view of a portion of a hole saw 700 according to another embodiment. The hole saw 700 is similar to the hole saw 100 of FIGS. 1-5; therefore, similar components are designated with similar references numbers plus 600. At least some differences and/or at least some similarities between the hole saws 100, 700 will be discussed in detail below. In addition, components or features described with respect to one or some of the embodiments described herein are equally applicable to any other embodiments described herein and can include similar reference numbers.

The illustrated hole saw 700 is moveable about a rotational axis 750 in a cutting direction 755 and includes a sidewall 715 having a first end 720 and a second end 725. The sidewall 715 also includes gullets 775 (only one gullet 775 is illustrated in FIG. 7) each defining a central longitudinal axis 780. Each gullet 775 includes a notch 805, an open end 785, a bottom surface 790 defining a second radius 845, a leading surface 795, and a trailing surface 800. Each trailing surface 800 includes a trailing surface portion 810 defining a first radius 830, a first portion 815, and a second portion 820 with the trailing surface portion 810 positioned between the first portion 815 and the second portion 820. Each leading surface 795 includes a third portion 945, a fourth portion 950, and a support surface 955 positioned between the third portion 945 and the fourth portion 950 in a direction parallel to the rotational axis 750. The support surface 955 is also positioned at a support surface distance 960 between about 0.7 inches and about 1 inch from the first end 720 of the sidewall 715. In other embodiments, the support surface 955 can be formed within at least one of the gullets 775. In the illustrated embodiment, the third portion 945 is oriented parallel to the fourth portion 950 of each leading surface 795 and the first portion 815 of each trailing surface 800. Each third portion 945 and fourth portion 950 are also offset (e.g., nonlinear) relative to each other. In other embodiments, the third portion 945 can be obliquely angled relative to the first portion 815 and/or the fourth portion 950. Each support surface 955 is oriented at a support angle 965 relative to the rotational axis 750. The support angle 965 is less than 90 degrees relative to the rotational axis 750 so that the support surface 955 is angled downwardly and toward the cutting direction 755 (e.g., the support surface 955 generally faces upwardly toward the first end 720). In other embodiments, the support angle 965 can be less than 90 degrees and greater than 75 degrees relative to the rotational axis 750. Also, each support surface 955 is positioned above the trailing surface portion 810 in a direction parallel to the rotational axis 750. In other embodiments, each support surface 955 can be positioned at the same height of the trailing surface portion 810 or positioned below the trailing surface portion 810.

The hole saw 700 also includes cutting teeth 875 (only one cutting tooth 875 is illustrated in FIG. 7) each having a cutting tip 880 and seated within one notch 805. Each cutting tooth 875 includes a rake surface 885 and a relief surface 890.

In operation, a cylindrical workpiece plug can be removed from the hole saw 700 by using a tool (e.g., a screwdriver or the like). In particular, the tool is inserted within one of the gullets 775 below the cylindrical workpiece plug. In some embodiments, the tool engages the bottom surface 790 of the gullet 775 to leverage and push the cylindrical workpiece plug out of the first end 720. The tool can also engage the support surface 955 to leverage and push the cylindrical workpiece plug out of the first end 720. As the support surface 955 is angled downwardly and toward the cutting direction 755, the tool can be captured on the support surface 955 without sliding into the gullet 775 as the tool is used to leverage the cylindrical workpiece plug out of the hole saw 700.

Figures 8, 9:
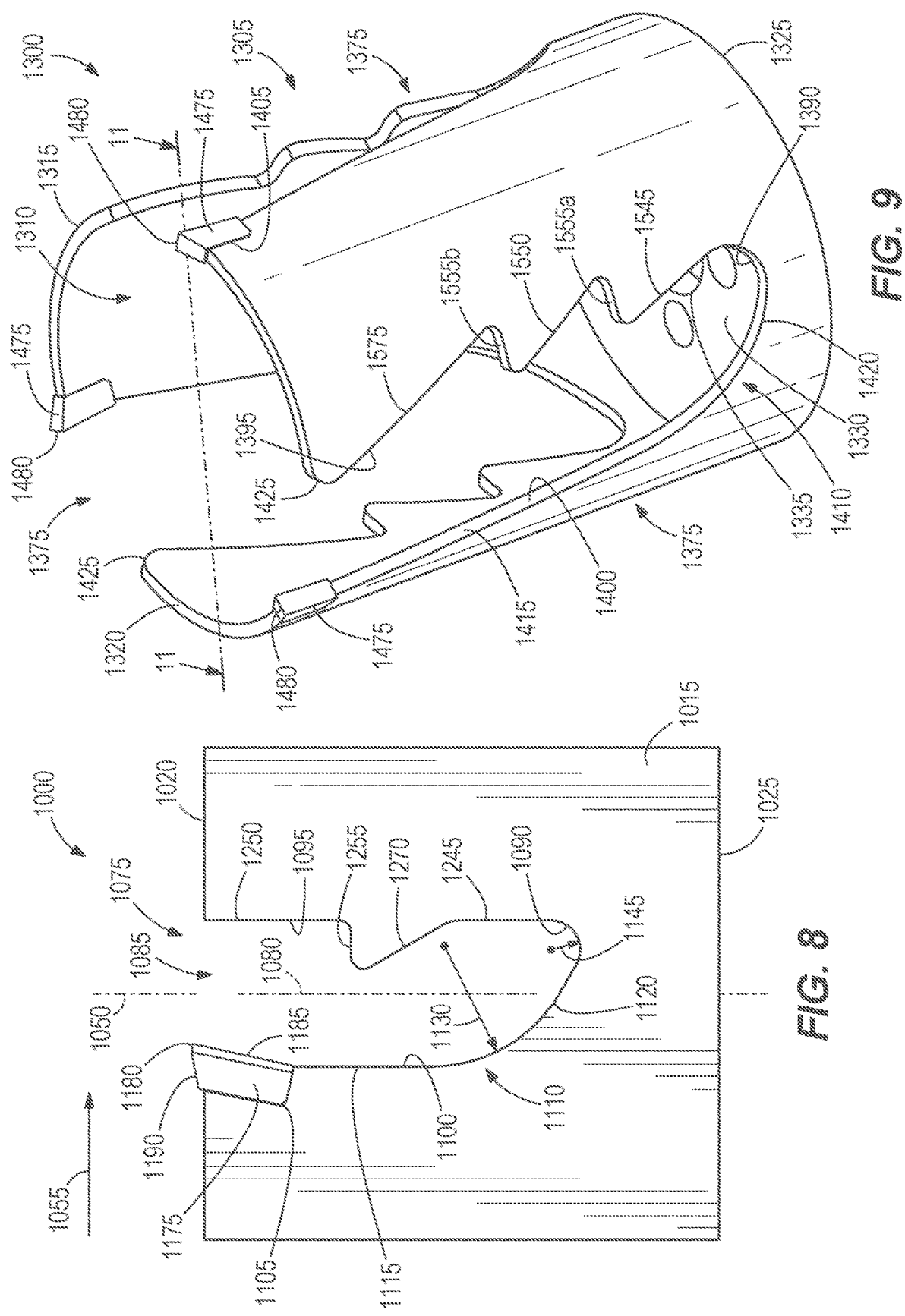
FIG. 8 is a planar side view of a hole saw according to another embodiment of the invention.
FIG. 9 is a perspective view of a hole saw according to another embodiment of the invention.

FIG. 8 illustrates a planar view of a portion of a hole saw 1000 according to another embodiment. The hole saw 1000 is similar to the hole saw 100 of FIGS. 1-5; therefore, similar components are designated with similar references numbers plus 900. At least some differences and/or at least some similarities between the hole saws 100, 1000 will be discussed in detail below. In addition, components or features described with respect to only one or some of the embodiments described herein are equally applicable to any other embodiments described herein and can include similar reference numbers.

The illustrated hole saw 1000 is moveable about a rotational axis 1050 in a cutting direction 1055 and includes a sidewall 1015 having a first end 1020 and a second end 1025. The sidewall 1015 also includes gullets 1075 (only one gullet 1075 is illustrated in FIG. 8) each defining a central longitudinal axis 1080. Each gullet 1075 includes a notch 1105, an open end 1085, a bottom surface 1090 defining a second radius 1145, a leading surface 1095, and a trailing surface 1100. Each trailing surface 1100 includes a trailing surface portion 1110 defining a first radius 1130, a first portion 1115, and a second portion 1120 with the trailing surface portion 1110 positioned between the first portion 1115 and the second portion 1120. Each leading surface 1095 includes a third portion 1245, a fourth portion 1250, and a support surface 1255 (similar to the support surface 955 of FIG. 7) formed on a protrusion 1270 of the sidewall 1015, which extends into each gullet 1075. The illustrated third portion 1245 and fourth portion 1250 are substantially collinear surfaces with the support surface 1255 oriented at a substantially 90 degree angle relative to the rotational axis 1050.

The hole saw 1000 also includes cutting teeth 1175 (only one cutting tooth 1175 is illustrated in FIG. 8) each having a cutting tip 1180 and seated within one notch 1105. Each cutting tooth 1175 includes a rake surface 1185 and a relief surface 1190.

Figure 10:
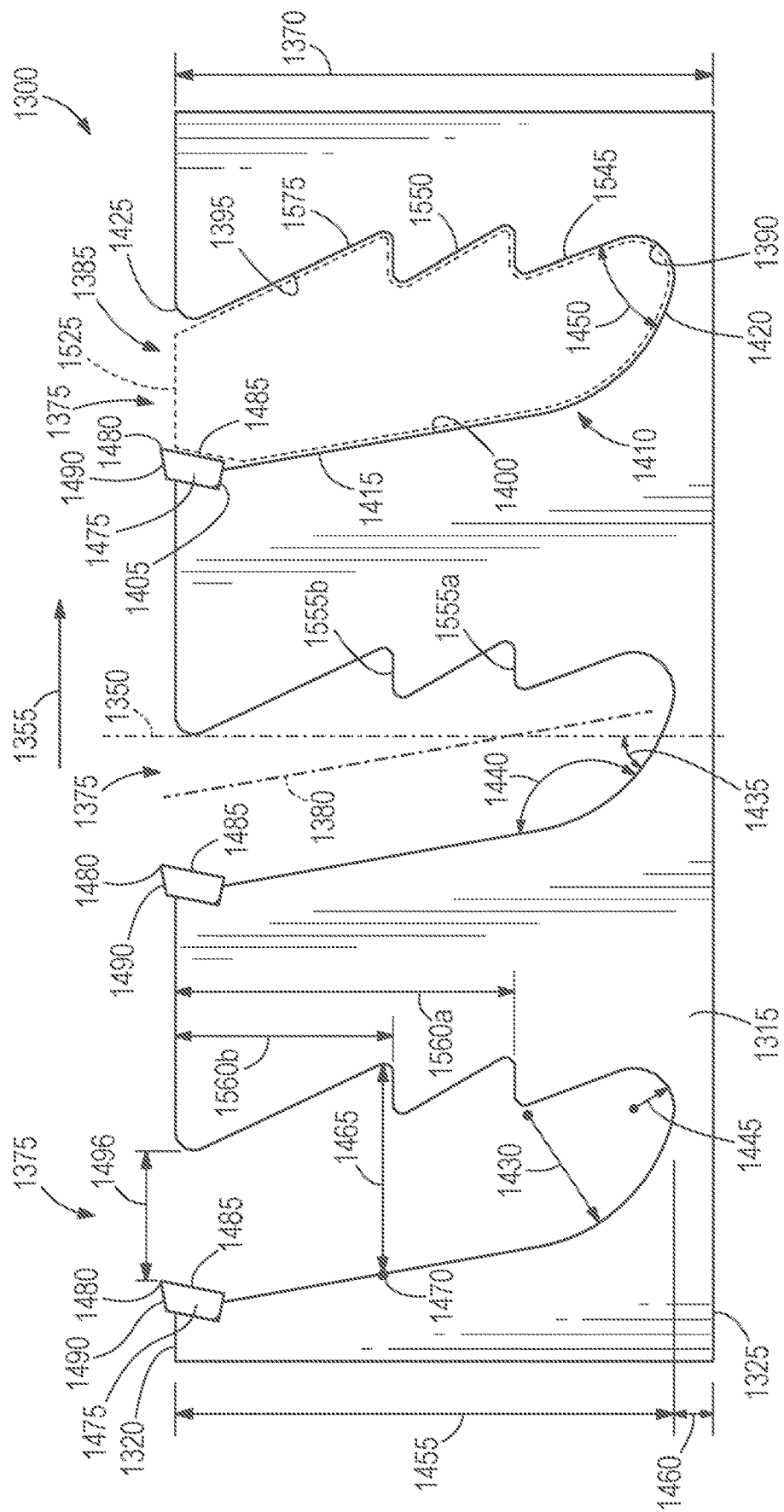
FIG. 10 is a side view of the hole saw of FIG. 9 in a flattened state and illustrating three gullets.
Figure 11:
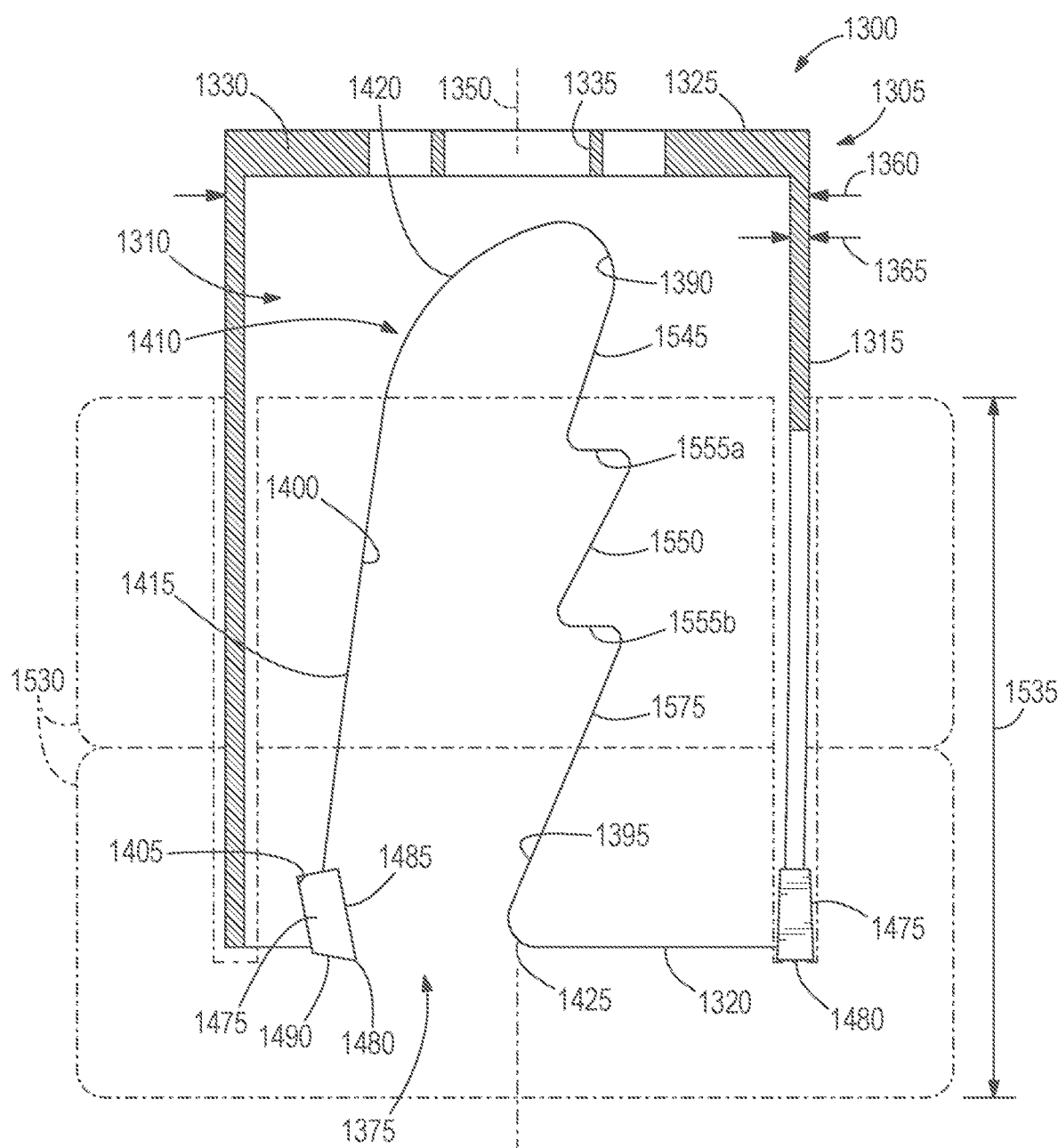
FIG. 11 is a cross sectional view of the hole saw taken along line 11-11 of FIG. 9 with the hole saw cutting through two workpieces.

FIGS. 9-11 illustrate a hole saw 1300 according to another embodiment. The hole saw 1300 is similar to the hole saw 100 of FIGS. 1-5; therefore, similar components are designated with similar references numbers plus 1200. At least some differences and/or at least some similarities between the hole saws 100, 1300 will be discussed in detail below. In addition, components or features described with respect to one or some of the embodiments described herein are equally applicable to any other embodiments described herein and can include similar reference numbers.

The illustrated hole saw 1300 is moveable about a rotational axis 1350 in a cutting direction 1355 and includes a cylindrical body 1305 having a sidewall 1315 that defines a cavity 1310 and an end cap 1330 having an aperture 1335. The sidewall 1315 includes a first end 1320 and a second end 1325. The sidewall 1315 defines a maximum outer diameter 1360 (FIG. 11), a maximum thickness 1365 (FIG. 11), and a sidewall height or dimension 1370 (FIG. 10) extending between the first end 1320 and the second end 1325 in a direction parallel to the rotational axis 1350. The sidewall height 1370 can be between about 3.3 inches and about 3.7 inches. In other embodiments, the sidewall height 1370 can be between about 3.7 inches and about 4.5 inches. The sidewall 1315 also includes gullets 1375 each defining a central longitudinal axis 1380 oriented at an oblique angle (e.g., between about 5 degrees and about 15 degrees) relative to the rotational axis 1350. Each gullet 1375 includes a notch 1405, an open end 1385, a bottom surface 1390 defining a second radius 1445, a leading surface 1395, and a trailing surface 1400. Each trailing surface 1400 includes a trailing surface portion 1410 defining a first radius 1430, a first portion 1415, and a second portion 1420 with the trailing surface portion 1410 positioned between the first portion 1415 and the second portion 1420. Each leading surface 1395 includes an edge 1425 and two support surfaces 1555a, 1555b (similar to the support surfaces 955, 1255 illustrated in FIGS. 7 and 8) so that each leading surface 1395 includes a third portion 1545, a fourth portion 1550, and a fifth portion 1575. With the two support surfaces 1555a, 1555b formed in the leading surface 1395, the leading surface 1395 defines a zig-zag shaped surface. The illustrated third portion 1545, fourth portion 1550, and fifth portion 1575 are all linear surfaces with the third portion 1545 obliquely oriented relative to the fourth portion 1550 and the fourth portion 1550 oriented substantially parallel to the fifth portion 1575. In other embodiments, two or more of the third portion 1545, the fourth portion 1550, and the fifth portion 1575 can be substantially parallel relative to each other or obliquely oriented relative to each other. In further embodiments, at least one of the third portion 1545, the fourth portion 1550, and the fifth portion 1575 can be a curved surface. In yet further embodiments, the third portion 1545, the fourth portion 1550, the fifth portion 1575, and the two support surface 1555a, 1555b can be omitted so that the leading surface 1395 is one linear surface. The illustrated first support surface 1555a is positioned from the first end 1320 at a first support distance 1560a of between about 2 inches and about 2.2 inches. The second support surface 1555b is positioned from the first end 1320 at a second support distance 1560b of between about 1 inch and about 1.5 inches. In other embodiments, each leading surface 1395 can include one support surface. In other embodiments, each leading surface 1395 can include more than two support surfaces.

In addition, each gullet 1375 defines an oblique angle 1435 between the second portion 1420 and the rotational axis 1350. The oblique angle 1435 is between about 55 degrees and about 65 degrees. In particular, the oblique angle 1435 is defined between the rotational axis 1350 and a tangent line extending through a midpoint of the second portion 1420. A first angle 1440 is defined between the first portion 1415 and the second portion 1420 that is between about 120 degrees and about 135 degrees. In particular, the first angle 1440 is defined between the first portion 1415 and a tangent line extending through a midpoint of the second portion 1420. In other embodiments with the first portion 1415 defining a curved surface, the first angle 1440 is defined between tangent lines extending through midpoints of the first and second portions 1415, 1420. A second angle 1450 is defined between the second portion 1420 and the third portion 1545 that is between about 35 degrees and about 45 degrees. In particular, the second angle 1450 is defined between the third portion 1545 and a tangent line extending through a midpoint of the second portion 1420. In other embodiments with the third portion 1545 defining a curved surface, the second angle 1450 is defined between tangent lines extending through midpoints of the second and third portions 1420, 1545.

As best shown in FIG. 10, each gullet 1375 defines a gullet height or dimension 1455 extending between the first end 1320 and the bottom surface 1390 in a direction parallel to the rotational axis 1350. The illustrated gullet height 1455 is between about 3 inches and about 3.2 inches. In other embodiments, the gullet height 1455 can be between about 3.2 inches and about 4 inches, or the gullet height 1455 can be between about 2.5 inches and about 3 inches. As such, a ratio of the sidewall height 1370 over the gullet height 1455 is between about 1.05 and about 1.2. In other embodiments, the ratio can be between about 1.2 and about 2. The illustrated sidewall 1315 also defines a height 1460 extending between the bottom surface 1390 of each gullet 1375 and the second end 1325 of the sidewall 1315. The height 1460 is between about 0.3 inches and about 0.4 inches. In other embodiments, the height 1460 can be between about 0.4 inches and about 1 inch, or the height 1460 can be between about 0.1 inches and about 0.3 inches. In addition, a maximum gullet width 1465 is defined by a point 1470 on the first portion 1415 and the fifth portion 1575 adjacent the second support surface 1555*b*.

The hole saw 1300 also includes cutting teeth 1475 each having a cutting tip 1480 and seated within one notch 1405. Each cutting tooth 1475 includes a rake surface 1485 and a relief surface 1490. A minimum gullet width 1496 extends between each cutting tip 1480 and the corresponding leading surface 1395. Once the cutting teeth 1475 are coupled to the sidewall 1315, each gullet 1375 defines an area 1525 between the rake surface 1485, the trailing surface 1400, the bottom surface 1390, and the leading surface 1395. In the illustrated embodiment, the area 1525 of each gullet 1375 is equal to or greater than 3.2 inches squared. In other embodiments, the area 1525 of each gullet 1375 is between about 2 inches squared and about 4 inches squared. In further embodiments, the area 1525 of each gullet 1375 is between about 3.2 inches squared and about 4 inches squared. As the hole saw 1300 includes three gullets 1375, the total area of the illustrated gullets 1375 is equal to or greater than 9.6 inches squared. Each gullet 1375 also defines a volume, which is determined by multiplying the area 1525 of each gullet 1375 by the maximum thickness 1365 of the sidewall 1315. As such, the volume of each gullet 1375 is equal to or greater than 0.256 inches cubed. In other embodiments, the volume of each gullet 1375 can be between about 0.227 inches cubed and about 0.3 inches cubed.

With reference to FIG. 11, the hole saw 1300 is operable to cut into two workpieces 1530 that defines a workpiece height 1535. In the illustrated embodiment, the workpiece height 1535 is about 3 inches (e.g., two standard 2 by 4 pieces of lumber). In other embodiments, the workpiece height 1535 can be less than 3 inches. In further embodiments, the workpiece height 1535 can be between about 1.5 inches and about 3 inches. In yet further embodiments, the two workpieces 1530 can be formed as one workpiece with the workpiece height 1535. In operation, the cutting teeth 1475 cut into the two workpieces 1530, thereby forming workpiece chips that collect within the gullets 1375. As the hole saw 1300 bores deeper into the two workpieces 1530, more workpiece chips are collected within the gullets 1375. Accordingly, the illustrated gullets 1375 include a particular volume to accommodate the workpiece chips as the hole saw 1300 cuts into the two workpieces 1530. Once the hole saw 1300 bores through the two workpieces 1530, a cylindrical workpiece plug will be removed from the cavity 1310 of the hole saw 1300. In one embodiment, a user can grip the cylindrical workpiece plug (via their fingers) through the gullets 1375 to axially slide the cylindrical workpiece plug along the rotational axis 1350 and out of the cavity 1310. In other embodiments, a tool can be inserted into one of the gullets 1375 to be supported on one of the support surfaces 1555*a*, 1555*b* for a user to leverage the cylindrical workpiece plug out of the hole saw 1300.

FIG. 12 illustrates a planar view of a portion of a hole saw 1600 according to another embodiment. The hole saw 1600 is similar to the hole saw 100 of FIGS. 1-5; therefore, similar components are designated with similar references numbers plus 1500. At least some differences and/or at least some similarities between the hole saws 100, 1600 will be discussed in detail below. In addition, components or features described with respect to only one or some of the embodiments described herein are equally applicable to any other embodiments described herein and can include similar reference numbers. For example, the hole saw 1600 can be sized to bore into the single workpiece 330 of FIG. 5 similar to the hole saw 100, or the hole saw 1600 can be sized to bore into the two workpieces 1530 of FIG. 11 similar to the hole saw 1300.

The illustrated hole saw 1600 is moveable about a rotational axis 1650 in a cutting direction 1655 and includes a sidewall 1615 having a first end 1620 and a second end 1625. The sidewall 1615 also includes gullets 1675 (only one gullet 1675 is illustrated in FIG. 12) each defining a central longitudinal axis 1680. Each gullet 1675 includes a notch 1705, an open end 1685, a bottom surface 1690 defining a second radius 1745, a leading surface 1695, and a trailing surface 1700. Each trailing surface 1700 includes a trailing surface portion 1710 defining a first radius 1730, a first portion 1715, and a second portion 1720 with the trailing surface portion 1710 positioned between the first portion 1715 and the second portion 1720. The sidewall 1615 also includes three support apertures 1880 (only one is illustrated in FIG. 12) each positioned at a substantially same location that is circumferentially between adjacent gullets 1675. In particular, each support aperture 1880 is positioned above the bottom surfaces 1690 of the gullets 1675. For example, each support aperture 1880 is positioned above the trailing surface portions 1710 of the gullets 1675. Each support aperture 1880 is also positioned between adjacent gullets 1675 as to not circumferentially overlap with any portion of the gullets 1675. Each support aperture 1880 is oblong-shaped and includes a longitudinal axis that is substantially perpendicular to the rotational axis 1650. The support apertures 1880 function similar to the support surfaces illustrated within FIGS. 7-11 for a tool to be inserted into one of the support apertures 1880 to leverage and remove a cylindrical workpiece plug from the hole saw 1600. In other embodiments, the sidewall 1615 can include fewer than or more than three support apertures 1880 and/or the support apertures 1880 can be located at different positions circumferentially around the sidewall 1615.

The hole saw 1600 also includes cutting teeth 1775 (only one cutting tooth 1775 is illustrated in FIG. 12) each having a cutting tip 1780 and seated within one notch 1705. Each cutting tooth 1775 includes a rake surface 1785 and a relief surface 1790.

FIG. 13 illustrates a planar view of a portion of a hole saw 1900 according to another embodiment. The hole saw 1900 is similar to the hole saw 100 of FIGS. 1-5; therefore, similar components are designated with similar references numbers plus 1800. At least some differences and/or at least some similarities between the hole saws 100, 1900 will be discussed in detail below. In addition, components or features described with respect to one or some of the embodiments described herein are equally applicable to any other embodiments described herein and can include similar reference numbers. For example, the hole saw 1900 can be sized to bore into the single workpiece 330 of FIG. 5 similar to the hole saw 100, or the hole saw 1900 can be sized to bore into the two workpieces 1530 of FIG. 11 similar to the hole saw 1300.

The illustrated hole saw 1900 is moveable about a rotational axis 1950 in a cutting direction 1955 and includes a sidewall 1915 having a first end 1920 and a second end 1925. The sidewall 1915 also includes gullets 1975 (only one gullet 1975 is illustrated in FIG. 13) each defining a central longitudinal axis 1980. Each gullet 1975 includes a notch 2005, an open end 1985, a bottom surface 1990 defining a second radius 2045, a leading surface 1995, and a trailing surface 2000. In particular, the second radius 2045 of each bottom surface 1990 extends directly from the trailing surface 2000 to the leading surface 1995. The sidewall 1915 also includes three support apertures 2180 (only one is illustrated in FIG. 13) each positioned below the bottom surfaces 1900. Each support aperture 2180 is also positioned as to circumferentially overlap with one of the gullets 1975.

The hole saw 1900 also includes cutting teeth 2075 (only one cutting tooth 2075 is illustrated in FIG. 13) each having a cutting tip 2080 and seated within one notch 2005. Each cutting tooth 2075 includes a rake surface 2085 and a relief surface 2090.

FIG. 14 illustrates a planar view of a portion of a hole saw 2200 according to another embodiment. The hole saw 2200 is similar to the hole saw 100 of FIGS. 1-5; therefore, similar components are designated with similar references numbers plus 2100. At least some differences and/or at least some similarities between the hole saws 100, 2200 will be discussed in detail below. In addition, components or features described with respect to one or some of the embodiments described herein are equally applicable to any other embodiments described herein and can include similar reference numbers. For example, the hole saw 2200 can be sized to bore into the single workpiece 330 of FIG. 5 similar to the hole saw 100, or the hole saw 2200 can be sized to bore into the two workpieces 1530 of FIG. 11 similar to the hole saw 1300.

The illustrated hole saw 2200 is moveable about a rotational axis 2250 in a cutting direction 2255 and includes a sidewall 2215 having a first end 2220 and a second end 2225. The sidewall 2215 also includes gullets 2275 (only one gullet 2275 is illustrated in FIG. 14) each defining a central longitudinal axis 2280. Each gullet 2275 includes a notch 2305, an open end 2285, a bottom surface 2290 defining a second radius 2345, a leading surface 2295, and a trailing surface 2300. Each trailing surface 2300 includes a trailing surface portion 2310 defining a first radius 2330, a first portion 2315, and a second portion 2320 with the trailing surface portion 2310 positioned between the first portion 2315 and the second portion 2320. The first portion 2315 of each gullet 2275 defines a third angle 2440 that extends from the notch 2305 to the trailing surface portion 2310 in a direction away from the cutting direction 2255. As a result, the trailing surface portion 2310 is positioned behind the first portion 2315 relative to the cutting direction 2255. In other embodiments, the third angle 2440 can be oriented in a direction toward the cutting direction 2255 with at least a portion of the trailing surface portion 2310 positioned behind a portion of the first portion 2315 in a direction relative to the cutting direction 2255. The sidewall 2215 also includes three support apertures 2480 (only one is illustrated in FIG. 14) each positioned below a trailing surface portion 2310.

The hole saw 2200 also includes cutting teeth 2375 (only one cutting tooth 2375 is illustrated in FIG. 14) each having a cutting tip 2380 and seated within one notch 2305. Each cutting tooth 2375 includes a rake surface 2385 and a relief surface 2390.

FIG. 15 illustrates a planar view of a portion of a hole saw 2500 according to another embodiment. The hole saw 2500 is similar to the hole saw 100 of FIGS. 1-5; therefore, similar components are designated with similar references numbers plus 2400. At least some differences and/or at least some similarities between the hole saws 100, 2500 will be discussed in detail below. In addition, components or features described with respect to one or some of the embodiments described herein are equally applicable to any other embodiments described herein and can include similar reference numbers. For example, the hole saw 2500 can be sized to bore into the single workpiece 330 of FIG. 5 similar to the hole saw 100, or the hole saw 2500 can be sized to bore into the two workpieces 1530 of FIG. 11 similar to the hole saw 1300.

The illustrated hole saw 2500 is moveable about a rotational axis 2550 in a cutting direction 2555 and includes a sidewall 2515 having a first end 2520 and a second end 2525. The sidewall 2515 also includes gullets 2575 (only one gullet 2575 is illustrated in FIG. 15) each defining a central longitudinal axis 2580. Each gullet 2575 includes a notch 2605, an open end 2585, a bottom surface 2590 defining a second radius 2645, a leading surface 2595, and a trailing surface 2600. Each leading surface 2595 includes a support surface 2755 positioned between a third portion 2745 and a fourth portion 2750.

The hole saw 2500 also includes cutting teeth 2675 (only one cutting tooth 2675 is illustrated in FIG. 15) each having a cutting tip 2680 and seated within one notch 2605. Each cutting tooth 2675 includes a rake surface 2685 and a relief surface 2690.

FIG. 16 illustrates a planar view of a portion of a hole saw 2800 according to another embodiment. The hole saw 2800 is similar to the hole saw 100 of FIGS. 1-5; therefore, similar components are designated with similar references numbers plus 2700. At least some differences and/or at least some similarities between the hole saws 100, 2800 will be discussed in detail below. In addition, components or features described with respect to one or some of the embodiments described herein are equally applicable to any other embodiments described herein and can include similar reference numbers. For example, the hole saw 2800 can be sized to bore into the single workpiece 330 of FIG. 5 similar to the hole saw 100, or the hole saw 2800 can be sized to bore into the two workpieces 1530 of FIG. 11 similar to the hole saw 1300.

The illustrated hole saw 2800 is moveable about a rotational axis 2850 in a cutting direction 2855 and includes a sidewall 2815 having a first end 2820 and a second end 2825. The sidewall 2815 also includes gullets 2875 (only one gullet 2875 is illustrated in FIG. 16) each defining a central longitudinal axis 2880. Each gullet 2875 includes a notch 2905, an open end 2885, a bottom surface 2890 defining a second radius 2945, a leading surface 2895, and a trailing surface 2900. Each trailing surface 2900 includes a trailing surface portion 2910 defining a first radius 2930, a first portion 2915, and a second portion 2920 with the trailing surface portion 2910 positioned between the first portion 2915 and the second portion 2920. The sidewall 2815 also includes three support apertures 3080 (only one is illustrated in FIG. 16). Each support aperture 3080 defines a greater area than an area of one of the gullets 2875. Each support aperture 3080 circumferentially overlaps with one of the gullets 2875 so that the leading surface 2895 of the gullet 2875 is positioned forward the support aperture 3080 but a portion of the support aperture 3080 is positioned behind the trailing surface 2900 of the gullet 2875 relative to the cutting direction 2855.

The hole saw 2800 also includes cutting teeth 2975 (only one cutting tooth 2975 is illustrated in FIG. 16) each having a cutting tip 2980 and seated within one notch 2905. Each cutting tooth 2975 includes a rake surface 2985 and a relief surface 2990.

FIG. 17 illustrates a planar view of a portion of a hole saw 3100 according to another embodiment. The hole saw 3100 is similar to the hole saw 100 of FIGS. 1-5; therefore, similar components are designated with similar references numbers plus 3000. At least some differences and/or at least some similarities between the hole saws 100, 3100 will be discussed in detail below. In addition, components or features described with respect to one or some of the embodiments described herein are equally applicable to any other embodiments described herein and can include similar reference numbers. For example, the hole saw 3100 can be sized to bore into the single workpiece 330 of FIG. 5 similar to the hole saw 100 or the hole saw 3100 can be sized to bore into the two workpieces 1530 of FIG. 11 similar to the hole saw 1300.

The illustrated hole saw 3100 is moveable about a rotational axis 3150 in a cutting direction 3155 and includes a sidewall 3115 having a first end 3120 and a second end 3125. The sidewall 3115 also includes gullets 3175 (only one gullet 3175 is illustrated in FIG. 17) each defining a central longitudinal axis 3180. Each gullet 3175 includes a notch 3205, an open end 3185, a bottom surface 3190 defining a second radius 3245, a leading surface 3195, and a trailing surface 3200. Each trailing surface 3200 includes a trailing surface portion 3210 defining a first radius 3230, a first portion 3215, and a second portion 3220 with the trailing surface portion 3210 positioned between the first portion 3215 and the second portion 3220. The sidewall 3115 also includes three support apertures 3380 (only one is illustrated in FIG. 17). Each support aperture 3380 circumferentially overlaps with one of the gullets 3175 so that a portion of the support aperture 3380 is positioned forward the leading surface 3195 but a portion of the first portion 3215 is positioned behind the support aperture 3380 relative to the cutting direction 3155.

The hole saw 3100 also includes cutting teeth 3275 (only one cutting tooth 3275 is illustrated in FIG. 17) each having a cutting tip 3280 and seated within one notch 3205. Each cutting tooth 3275 includes a rake surface 3285 and a relief surface 3290.

Figure 18:
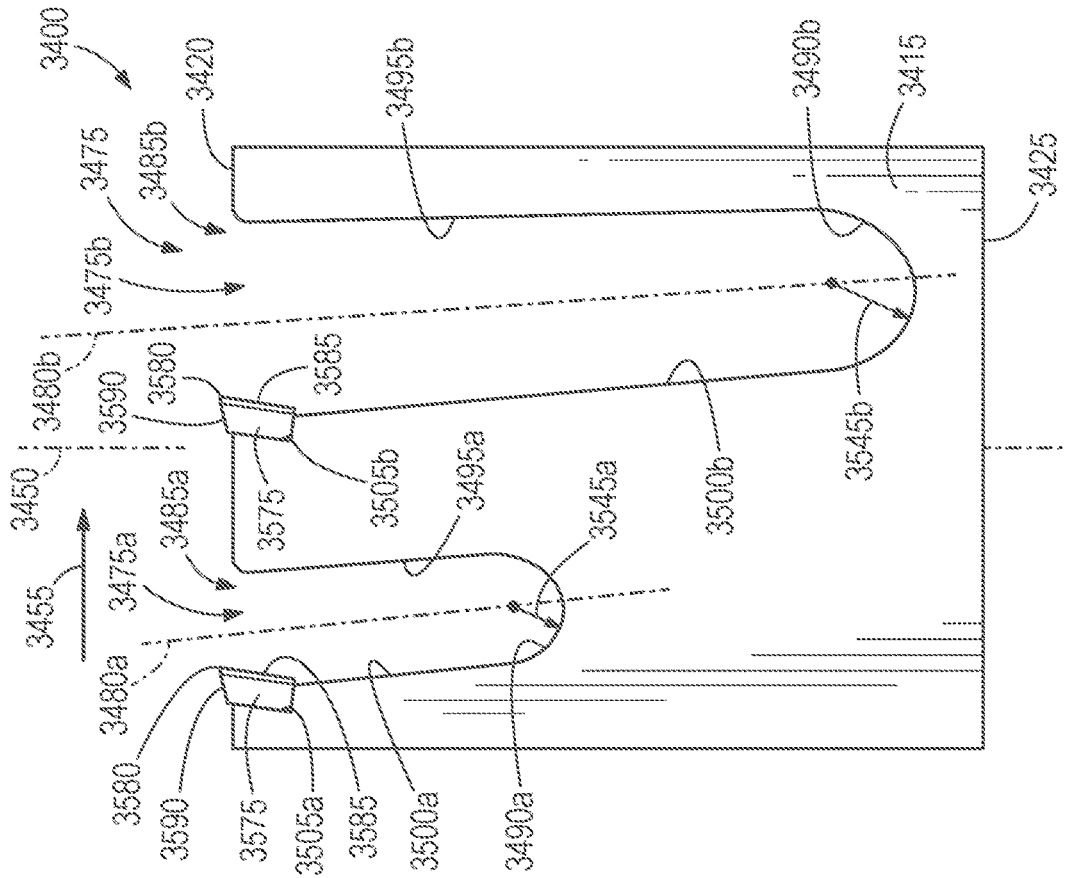
FIG. 18 is a planar side view of a hole saw according to another embodiment of the invention.

FIG. 18 illustrates a planar view of a portion of a hole saw 3400 according to another embodiment. The hole saw 3400 is similar to the hole saw 100 of FIGS. 1-5; therefore, similar components are designated with similar references numbers plus 3300. At least some differences and/or at least some similarities between the hole saws 100, 3400 will be discussed in detail below. In addition, components or features described with respect to one or some of the embodiments described herein are equally applicable to any other embodiments described herein and can include similar reference numbers. For example, the hole saw 3400 can be sized to bore into the single workpiece 330 of FIG. 5 similar to the hole saw 100, or the hole saw 3400 can be sized to bore into the two workpieces 1530 of FIG. 11 similar to the hole saw 1300.

The illustrated hole saw 3400 is moveable about a rotational axis 3450 in a cutting direction 3455 and includes a sidewall 3415 having a first end 3420 and a second end 3425. The sidewall 3415 also includes three pairs of gullets 3475 (only one pair of gullets 3475 is illustrated in FIG. 18). Each pair 3475 includes a smaller gullet 3475a defining a central longitudinal axis 3480a and a larger gullet 3475b defining a central longitudinal axis 3480b. In the illustrated embodiment, the central longitudinal axes 3480a, 3480b are substantially parallel; however, in other embodiments, the central longitudinal axes 3480a, 3480b can be obliquely angled. The smaller gullet 3475a includes a notch 3505a, an open end 3485a, a bottom surface 3490a defining a second radius 3545a, a leading surface 3495a, and a trailing surface 3500a. Likewise, the larger gullet 3475b includes a notch 3505b, an open end 3485b, a bottom surface 3490b defining a second radius 3545b, a leading surface 3495b, and a trailing surface 3500b. The bottom surface 3490b of the larger gullet 3475b is positioned closer to the second end 3425 of the sidewall 3415 than the bottom surface 3490a of the smaller gullet 3475a. In other embodiments, the sidewall 3415 can include fewer or more than three pairs of gullets 3475. In the illustrated embodiment, the second radius 3545b of the larger gullet 3475b is greater than the second radius 3545a of the smaller gullet 3475a. In other embodiments, the second radius 3545b of the larger gullet 3475b can be equal to or less than the second radius 3545a of the smaller gullet 3475a.

The hole saw 3400 also includes cutting teeth 3575 (only one pair of cutting teeth 3575 are illustrated in FIG. 18) each having a cutting tip 3580 and seated within one notch 3505a, 3505b. Each cutting tooth 3575 includes a rake surface 3585 and a relief surface 3590.

Figure 19:
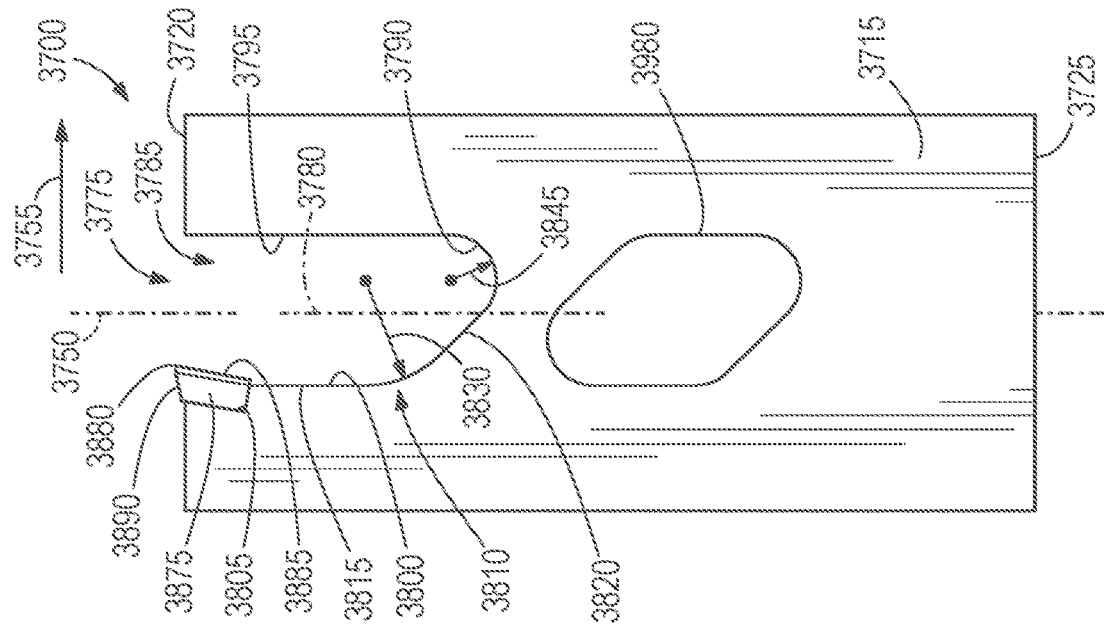
FIG. 19 is a planar side view of a hole saw according to another embodiment of the invention.

FIG. 19 illustrates a planar view of a portion of a hole saw 3700 according to another embodiment. The hole saw 3700 is similar to the hole saw 100 of FIGS. 1-5; therefore, similar components are designated with similar references numbers plus 3600. At least some differences and/or at least some similarities between the hole saws 100, 3700 will be discussed in detail below. In addition, components or features described with respect to one or some of the embodiments described herein are equally applicable to any other embodiments described herein and can include similar reference numbers. For example, the hole saw 3700 can be sized to bore into the single workpiece 330 of FIG. 5 similar to the hole saw 100, or the hole saw 3700 can be sized to bore into the two workpieces 1530 of FIG. 11 similar to the hole saw 1300.

The illustrated hole saw 3700 is moveable about a rotational axis 3750 in a cutting direction 3755 and includes a sidewall 3715 having a first end 3720 and a second end 3725. The sidewall 3715 also includes gullets 3775 (only one gullet 3775 is illustrated in FIG. 19) each defining a central longitudinal axis 3780 parallel to the rotational axis 3750. Each gullet 3775 includes a notch 3805, an open end 3785, a bottom surface 3790 defining a second radius 3845, a leading surface 3795, and a trailing surface 3800. Each trailing surface 3800 includes a trailing surface portion 3810 defining a first radius 3830, a first portion 3815, and a second portion 3820 with the trailing surface portion 3810 positioned between the first portion 3815 and the second portion 3820. The sidewall 3715 also includes three support apertures 3980 (only one is illustrated in FIG. 19). Each support aperture 3980 defines a longitudinal axis that substantially aligns with one central longitudinal axis 3780 of one gullet 3775. In particular, each support aperture 3980 is directly below one gullet 3775.

The hole saw 3700 also includes cutting teeth 3875 (only one cutting tooth 3875 is illustrated in FIG. 19) each having a cutting tip 3880 and seated within one notch 3805. Each cutting tooth 3875 includes a rake surface 3885 and a relief surface 3890.

Although the invention has been described in detail with reference to certain preferred embodiments, variations and modifications exist within the scope and spirit of one or more independent aspects of the invention as described. Various features and advantages of the invention are set forth in the following claims.

What is claimed is:

1. A hole saw movable about a rotational axis in a cutting direction to cut into a workpiece, the hole saw comprising:
    a cylindrical body including
        a sidewall having a first end and a second end opposite the first end,
        a gullet formed in the sidewall between a leading surface, a trailing surface, and a linear bottom surface of the sidewall, the gullet extending through the first end of the body, and
        a support aperture formed in the sidewall, the support aperture entirely surrounded by the sidewall, at least one side of the support aperture being parallel to the linear bottom surface of the sidewall, and an entirety of the support aperture being positioned closer than the linear bottom surface of the sidewall to the second end of the sidewall;
    a cutting tooth coupled to the first end of the sidewall adjacent the gullet; and
    an end cap coupled to the second end of the sidewall.

2. The hole saw of claim 1, wherein the support aperture has a maximum width measured in a direction perpendicular to the rotational axis, and wherein the maximum width of the support aperture is substantially equal to a maximum width of the gullet.

3. The hole saw of claim 1, wherein the gullet has a height measured in a direction parallel to the rotational axis, and wherein the height of the gullet is greater than half of a height of the sidewall.

4. The hole saw of claim 1, wherein the gullet has a height measured in a direction parallel to the rotational axis, and wherein the height of the gullet is greater than a height of the support aperture.

5. The hole saw of claim 1, wherein the support aperture is at least partially defined by four linear surfaces of the sidewall.

6. The hole saw of claim 1, wherein a shortest distance between the gullet and the support aperture measured parallel to the rotational axis is less than a shortest distance between the support aperture and the second end of the sidewall measured parallel to the rotational axis.

7. A hole saw movable about a rotational axis in a cutting direction to cut into a workpiece, the hole saw comprising:
    a cylindrical body including
        a sidewall having a first end and a second end opposite the first end,
        a gullet formed in the sidewall between a first surface, a second surface, and a third surface of the sidewall, the third surface extending between the first and second surfaces, the gullet extending through the first end of the sidewall, and
        a polygonal opening formed in the sidewall, the polygonal opening entirely surrounded by the sidewall and positioned between the third surface and the second end of the sidewall;
    a cutting tooth coupled to the first end of the sidewall adjacent the second surface of the gullet; and
    an end cap coupled to the second end of the sidewall,
wherein the gullet has a height measured in a direction parallel to the rotational axis, and wherein the height of the gullet is greater than a height of the polygonal opening.

8. The hole saw of claim 7, wherein the polygonal opening has a rounded parallelogram shape.

9. The hole saw of claim 7, wherein the polygonal opening includes a first side, a second side, a third side, and a fourth side, and wherein the first side of the polygonal opening is parallel with the third surface of the sidewall.

10. The hole saw of claim 9, wherein the first and second sides of the polygonal opening are parallel, and wherein the third and fourth sides of the polygonal opening are parallel.

11. The hole saw of claim 9, wherein the first, second, third, and fourth sides of the polygonal opening are connected by rounded corners.

12. The hole saw of claim 9, wherein the polygonal opening has a height measured between the first and second sides and parallel to the rotational axis, and wherein the height of the polygonal opening is greater than a shortest distance between the third surface of the sidewall and the first side of the polygonal opening measured parallel to the rotational axis.

13. The hole saw of claim 9, wherein the third surface of the sidewall is linear, and wherein the first side of the polygonal opening is linear.

14. The hole saw of claim 13, wherein a first arcuate surface is positioned between the first and third surfaces of the sidewall, and wherein a second arcuate surface is positioned between the second and third surfaces of the sidewall.

15. A hole saw movable about a rotational axis in a cutting direction to cut into a workpiece, the hole saw comprising:
    a cylindrical body including
        a sidewall having a first end and a second end opposite the first end,
        a gullet formed in the sidewall between a leading surface, a trailing surface, and a bottom surface of the sidewall, the gullet extending through the first end of the sidewall, the gullet having a maximum width measured between the leading surface and the trailing surface in a direction perpendicular to the rotational axis, and
        a support aperture formed in the sidewall, the support aperture having a first side, a second side opposite the first side, a linear third side extending between the first side and the second side, and a maximum width measured between the first side and the second side in the direction perpendicular to the rotational axis, the maximum width of the support aperture being substantially equal to the maximum width of the gullet;
    a cutting tooth coupled to the first end of the sidewall adjacent the gullet; and
    an end cap coupled to the second end of the sidewall.

16. The hole saw of claim 15, wherein the support aperture also has a fourth side extending between the first side and the second side.

17. The hole saw of claim 16, wherein
    the third side of the support aperture is a side of the support aperture nearest the gullet,
    the fourth side of the support aperture is a side of the support aperture nearest the second end of the sidewall, and
    the support aperture is devoid of material between the third and fourth sides.

18. The hole saw of claim 15, wherein the third side of the support aperture is positioned closer than the bottom surface of the sidewall to the second end of the sidewall.

19. The hole saw of claim 15, wherein
the gullet has a height measured parallel to the rotational axis,
the support aperture has a height measured parallel to the rotational axis, and
the height of the gullet is greater than the height of the support aperture.

20. The hole saw of claim 15, wherein a width of the gullet narrows from the maximum width as the gullet approaches the first end of the sidewall.

* * * * *